US008603609B2

(12) United States Patent
Fraser et al.

(10) Patent No.: US 8,603,609 B2
(45) Date of Patent: Dec. 10, 2013

(54) DISCONTINUOUSLY LAMINATED FILM

(75) Inventors: Robert W. Fraser, Lombard, IL (US);
Michael G. Borchardt, Naperville, IL (US); Jack A. MacPherson, Aurora, IL (US); Robert T. Dorsey, Western Springs, IL (US); Scott Binger, Bridgeview, IL (US); Shaun T. Broering, Fort Thomas, KY (US)

(73) Assignee: The Glad Products Company, Oakland, CA (US)

( * ) Notice: Subject to any disclaimer, the term of this patent is extended or adjusted under 35 U.S.C. 154(b) by 356 days.

(21) Appl. No.: 12/947,025

(22) Filed: Nov. 16, 2010

(65) Prior Publication Data

US 2011/0117307 A1 May 19, 2011

Related U.S. Application Data

(60) Provisional application No. 61/261,673, filed on Nov. 16, 2009.

(51) Int. Cl.
*B32B 3/00* (2006.01)
*B32B 27/00* (2006.01)
*B41M 5/00* (2006.01)

(52) U.S. Cl.
USPC ......... 428/172; 428/35.2; 428/35.7; 428/166; 428/167

(58) Field of Classification Search
USPC .................. 428/166, 172, 35.2, 35.7, 167
See application file for complete search history.

(56) References Cited

U.S. PATENT DOCUMENTS

| 2,714,571 A | 8/1955 | Irion et al. |
| 3,058,868 A | 10/1962 | Schroeder |
| 3,322,613 A | 5/1967 | Rasmussen |
| 3,622,422 A | 11/1971 | Newman et al. |
| 3,857,144 A | 12/1974 | Bustin |
| 4,116,892 A | 9/1978 | Schwarz |
| 4,153,664 A | 5/1979 | Sabee |
| 4,153,751 A | 5/1979 | Schwarz |
| 4,289,832 A | 9/1981 | Schwarz |
| 4,302,495 A | 11/1981 | Marra |
| 4,343,848 A | 8/1982 | Leonard, Jr. |
| 4,379,197 A | 4/1983 | Cipriani |
| 4,438,167 A | 3/1984 | Schwarz |
| 4,517,714 A | 5/1985 | Sneed et al. |
| 4,522,203 A | 6/1985 | Mays |
| 4,614,679 A | 9/1986 | Farrington, Jr. et al. |
| 4,692,368 A | 9/1987 | Taylor et al. |
| 4,704,238 A | 11/1987 | Okuyama et al. |
| 4,753,840 A | 6/1988 | Van Gompel |

(Continued)

FOREIGN PATENT DOCUMENTS

| WO | WO9913702 | 11/1990 |
| WO | WO9956953 | 11/1999 |

OTHER PUBLICATIONS

International Search Report, mailed Jan. 21, 2011, from counterpart PCT/US10/56799, filing date Nov. 16, 2010.

*Primary Examiner* — Donald J Loney
(74) *Attorney, Agent, or Firm* — Thomas C. Feix

(57) ABSTRACT

Polymer films may be discontinuously laminated by processes such as adhesive bonding, ultrasonic bonding, embossing, ring rolling, and strainable network formation. The films may be prestretched under cold process conditions before lamination. The laminates have superior properties such as tear strength. The laminates may be incorporated into bags, such as trash bags.

20 Claims, 15 Drawing Sheets

(56) References Cited

U.S. PATENT DOCUMENTS

| | | |
|---|---|---|
| 4,793,885 A | 12/1988 | Rasmussen |
| 4,930,905 A | 6/1990 | Sharps, Jr. |
| 5,035,941 A | 7/1991 | Blackburn |
| 5,100,721 A | 3/1992 | Akao |
| 5,167,897 A | 12/1992 | Weber et al. |
| 5,296,184 A | 3/1994 | Wu et al. |
| 5,382,461 A | 1/1995 | Wu |
| 5,422,172 A | 6/1995 | Wu |
| 5,518,801 A | 5/1996 | Chappell et al. |
| 5,851,937 A | 12/1998 | Wu et al. |
| 5,861,074 A | 1/1999 | Wu |
| 5,865,926 A | 2/1999 | Wu et al. |
| 6,013,151 A | 1/2000 | Wu et al. |
| 6,214,147 B1 | 4/2001 | Mortellite et al. |
| 6,254,736 B1 | 7/2001 | Earl et al. |
| 6,265,045 B1 | 7/2001 | Mushaben |
| 6,361,784 B1 | 3/2002 | Brennan et al. |
| 6,385,818 B1 | 5/2002 | Savicki, Sr. |
| 7,306,729 B2 | 12/2007 | Bacino et al. |
| 2002/0074691 A1 | 6/2002 | Mortellite et al. |
| 2003/0024625 A1 | 2/2003 | McAmish et al. |
| 2005/0123726 A1 | 6/2005 | Broering et al. |
| 2006/0083900 A1 | 4/2006 | Ashraf |
| 2006/0093766 A1 | 5/2006 | Savicki et al. |
| 2007/0166503 A1 | 7/2007 | Hannigan |
| 2007/0254120 A1* | 11/2007 | Rasmussen .................. 428/35.7 |
| 2007/0257402 A1* | 11/2007 | Rasmussen .................. 264/339 |
| 2008/0124461 A1 | 5/2008 | Leener et al. |
| 2009/0029114 A1 | 1/2009 | Cancio et al. |
| 2009/0068427 A1 | 3/2009 | Patel et al. |
| 2009/0264847 A1 | 10/2009 | Ashton et al. |

\* cited by examiner

DISCONTINUOUSLY LAMINATED FILM

CROSS REFERENCE TO RELATED APPLICATIONS

This application claims the benefit of U.S. Provisional Application No. 61/261,673, filed Nov. 16, 2009, which is hereby incorporated by reference in its entirety.

BACKGROUND OF THE INVENTION

1. Field of the Invention

This invention relates generally to co-laminated films. More particularly, the present invention relates generally to co-laminated film for bags. More particularly, the present invention relates generally to co-laminated film for trash bags.

2. Description of the Related Art

Laminates have been described in the prior art in order to achieve improved overall stiffness and tear resistance. Although lamination of uniaxial layers improves tear resistance transverse to the direction of stretching, tearing is easily effectuated along the longitudinal axis of stretching. Biaxial orientation of laminates improves stiffness and tear resistance in two directions, but the laminate is still highly susceptible to tears which run longitudinally along the combination of the axes. Further, the biaxial orientation methods used are not easily adaptable to high speed production processes.

The prior art extensively describes the importance of continuous and complete lamination. U.S. Pat. No. 5,100,721 to Akao describes a laminated film comprising a pair of coextruded multilayer inflation film layers disposed symmetrically and joined by blocking which provides a film that is excellent in physical strength and bag rupture strength. Akao describes the problems when the film layers are not completely laminated, describing that unless the area joining the inner layers of the inflation film to each other by blocking is rendered more than 95%, wrinkling and the separation at the blocking portion frequently occur in the lamination process caused by the air remaining in the unjoined portion.

Discontinuous lamination is described in U.S. Pat. No. 7,306,729 to Bacino et al. by applying a discontinuous lamination adhesive across the surface of the layers to bond layers to a membrane. U.S. Pat. App. 2007/0166503 to Hannigan describes laminating a lining material to a barrier layer through a coating method or by use of an adhesive, where the lamination may be performed using continuous or discontinuous lamination methods. U.S. Pat. App. 2008/0124461 to Leener describes the discontinuous lamination of credit cards. PCT publication WO1999056953 to Hoffman describes laminating corrugated sheets of paper to printed paper in a discontinuous lamination process using an applied adhesive layer. U.S. Pat. No. 4,302,495 to Marra describes discontinuous or spot bonded lamination can be provided by using an engraved pressure roll with a smooth backup roll to form a two layer nonwoven fabric from a melt-blown polypropylene microfiber mat and a directionally oriented thermoplastic netting layer. PCT publication WO199013702 to Rasmussen describes a process for the discontinuous lamination of technical textiles with adhesives.

Thermoplastic film, microporous film, and laminates thereof, are described in U.S. Pat. 2002/0074691 to Mortellite et al. Relevant patents regarding extrusion lamination of unstretched nonwoven webs include U.S. Pat. Nos. 2,714,571; 3,058,868; 4,522,203; 4,614,679; 4,692,368; 4,753,840 and 5,035,941. The above '868 and '368 patents disclose stretching extruded polymeric films prior to laminating with unstretched nonwoven fibrous webs at pressure roller nips. The '203 and '941 patents are directed to co-extruding multiple polymeric films with unstretched nonwoven webs at pressure roller nips. The '840 patent discloses preforming nonwoven polymeric fiber materials prior to extrusion laminating with films to improve bonding between the nonwoven fibers and films. More specifically, the '840 patent discloses conventional embossing techniques to form densified and undensified areas in nonwoven base layers prior to extrusion lamination to improve bonding between nonwoven fibrous webs and films by means of the densified fiber areas. The '941 patent also teaches that unstretched nonwoven webs that are extrusion laminated to single ply polymeric films are susceptible to pinholes caused by fibers extending generally vertically from the plane of the fiber substrate and, accordingly, this patent discloses using multiple co-extruded film plies to prevent pinhole problems. Furthermore, methods for bonding loose nonwoven fibers to polymeric film are disclosed in U.S. Pat. Nos. 3,622,422; 4,379,197 and 4,725,473. It has also been known to stretch nonwoven fibrous webs using intermeshing rollers to reduce basis weight and examples of patents in this area are U.S. Pat. Nos. 4,153,664 and 4,517,714. The '664 patent discloses a method of incremental cross direction (CD) or machine direction (MD) stretching nonwoven fibrous webs using a pair of interdigitating rollers to strengthen and soften nonwoven webs. The '664 patent also discloses an alternative embodiment wherein the nonwoven fibrous web is laminated to the thermoplastic film prior to intermesh stretching.

One large use of plastic films is as thermoplastic bags for liners in trash or refuse receptacles. Trash receptacles that employ such liners may be found at many locations, such as, from small household waste baskets and kitchen garbage cans. The trash canisters are typically made from a rigid material such as metal or plastic. Bags that are intended to be used as liners for such refuse containers are typically made from low-cost, pliable thermoplastic material. When the receptacle is full, the thermoplastic liner actually holding the trash can be removed for further disposal and replaced with a new liner. To avoid inadvertently spilling the contents during disposal, the bags must be tear and puncture resistant. Trash bags are typically formed by employing two pliable plastic sheets joined on three sides (or a U-folded plastic sheet joined on two sides) and open on the remaining side.

Another use of plastic films is as flexible plastic bags for storing food items, either temporarily as in the case of packaging snacks or long term as in the case of freezer storage. Plastic bags of this style typically include flexible sidewalls made from, for example polyethylene, that define an opening and an internal volume accessible through the opening, an example of which is described in U.S. Pat. No. 6,385,818 to Savicki Sr. To seal the bag, interlocking closure strips may be provided about the rim of the opening.

As is clear from the above discussion, continued technology improvement is needed to address the unique problems associated with improving the tear and puncture resistant of films, especially for trash bags.

BRIEF SUMMARY OF THE INVENTION

The thermoplastic films and bags may be produced in a high speed manufacturing process that develops continuous sheet-like films of thermoplastic material into the finished bag via automated equipment. The process may form discontinuous co-laminated films by mechanical, thermal, or adhesive lamination. These and other advantages and features of the thermoplastic films and bags will become apparent from the following description and accompanying drawings.

BRIEF DESCRIPTION OF THE DRAWINGS

The foregoing aspects and others will be readily appreciated by the skilled artisan from the following description of illustrative embodiments when read in conjunction with the accompanying drawings, in which.

DETAILED DESCRIPTION

Figure 1A:
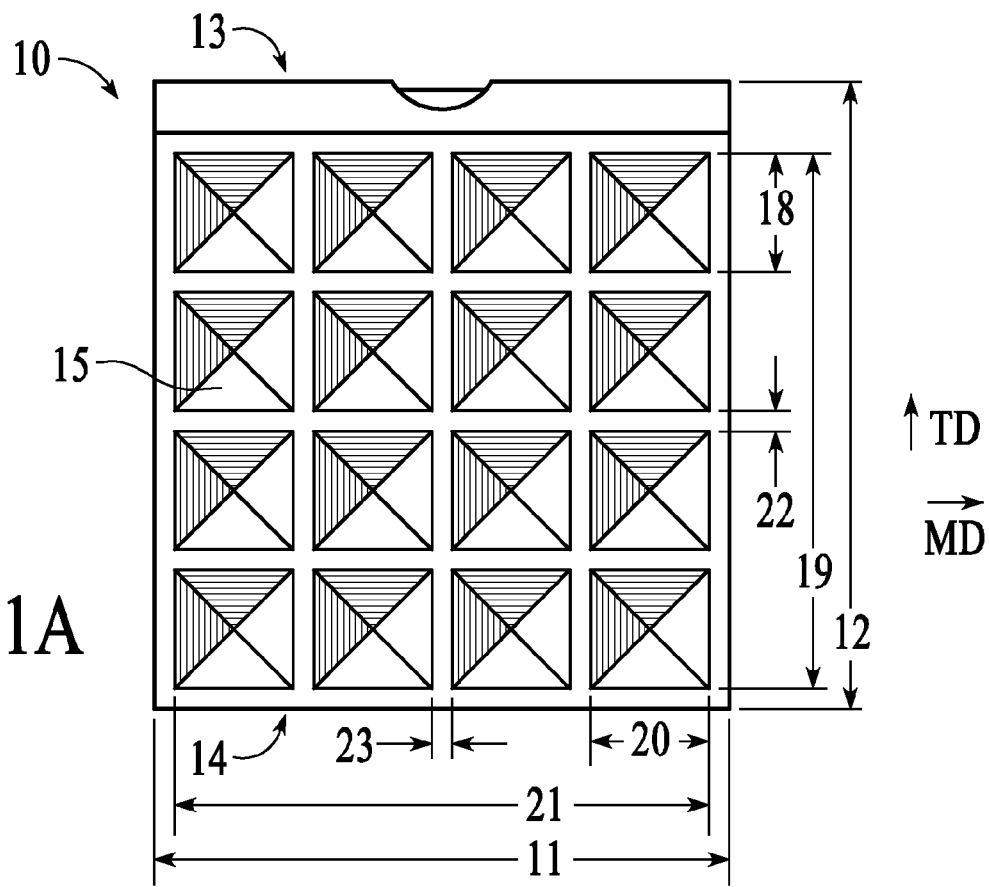
FIGS. 1A-H are front views of thermoplastic bags having a draw tape.

Reference will now be made to the drawings wherein like numerals refer to like parts throughout. For ease of description, the components of this invention are described in the normal (upright) operating position, and terms such as upper, lower, horizontal, top, bottom, etc., are used with reference to this position. It will be understood, however, that the components embodying this invention may be manufactured, stored, transported, used, and sold in an orientation other than the position described.

Figures illustrating the components of this invention show some conventional mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

All publications, patents and patent applications cited herein, whether supra or infra, are hereby incorporated by reference in their entirety to the same extent as if each individual publication, patent or patent application was specifically and individually indicated to be incorporated by reference.

As used herein and in the claims, the term "comprising" is inclusive or open-ended and does not exclude additional unrecited elements, compositional components, or method steps. Accordingly, the term "comprising" encompasses the more restrictive terms "consisting essentially of" and "consisting of".

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As utilized herein, the term "flexible" is utilized to refer to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain and when the applied strain is released the web materials return, to a substantial degree, to their untensioned condition. Such web materials exhibiting an elastic-like behavior have a wide range of utility, e.g. bags and trash bags, films for wrapping articles, durable articles of apparel, disposable articles of apparel, disposable hygiene articles, covering materials such as upholstery, wrapping materials for complex shapes and the like. In accordance with one construction providing an elastic-like material, a base material is formed with a strainable network comprising first areas defining a first network region and second areas defining a second network region, where the first and second regions may be expressed in terms of the length of the respective regions measured topographically over the surfaces of these regions when the strainable network is in an untensioned condition, i.e., expressed in terms of the "surface-pathlength" of the first and second network regions. The second network region has a "surface-pathlength" that is greater than that of the first network region. As used herein the term "surface-pathlength" refers to a measurement along the topographic surface of the region in question in a direction substantially parallel to an axis of the material. A method for determining the surface-pathlength of the respective regions can be found in the Test Methods section of U.S. Pat. No. 5,518,801 (Chappell et al.). When an strain force is applied to a strainable network, a rib-like element or rib-like elements, or a pleat or pleats, defining the second areas forming the second network region will undergo a geometric deformation under which they will flatten and extend while the first areas forming the first network region will undergo a molecular level deformation. This will cause the strainable network regions to exhibit an elastic-like behavior in the direction of the strain force when subjected to an applied and subsequently released strain force.

As used herein, the term "lamination", the term "laminate", and the phrase "laminated film", refer to the process, and resulting product, made by bonding together two or more layers of film or other materials. Lamination can be accomplished by joining layers by mechanical pressure, joining layers with adhesives, joining with heat and pressure, and even spread coating and extrusion coating. The term laminate is also inclusive of coextruded multilayer films comprising one or more tie layers. as a verb, "laminate" means to affix or adhere (by means of, for example, adhesive bonding, pressure bonding, corona lamination, and the like) two or more separately made film articles to one another so as to form a multilayer structure; as a noun, "laminate" means a product produced by the affixing or adhering just described.

As used herein, the term "oriented" refers to a polymer-containing film which has been stretched at ambient temperature or at an elevated temperature (the orientation temperature) and retaining the stretched dimensions. As used herein, "oriented" films are stretched in the solid state as contrasted to blown films which are stretched in the melt state. More particularly, the term "oriented", as used herein, refers to oriented films and articles fabricated from oriented films, wherein the orientation can be produced in one or more of a variety of manners.

As used herein, the phrase "machine direction", herein abbreviated "MD", or "longitudinal direction", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

An optional part of the film-making process is a procedure known as "orientation." The "orientation" of a polymer is a reference to its molecular organization, i.e., the orientation of molecules relative to each other. Similarly, the process of "orientation" is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process requires substantially different procedures. This is related to the different physical characteristics possessed by films made by the two conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (monoaxial orientation), the resulting film exhibits great strength and stiffness along the direction of stretch, but it is weak in the other direction, i.e., across the stretch, often splitting or tearing when flexed or pulled. To overcome this limitation, two-way or biaxial orientation is employed to more evenly distribute the strength qualities of the film in two directions. These biaxially oriented films tend to be stiffer and stronger, and also exhibit much better resistance to flexing or folding forces, leading to their greater utility in packaging applications.

Most biaxial orientation processes use apparatus that stretches the film sequentially, first in one direction and then in the other. Tenter frame orienting apparatus stretches the film first in the direction of the film travel, i.e., in the longitudinal or "machine direction" (MD), and then in the direction perpendicular to the machine direction, i.e., the lateral or "transverse direction" (TD). Unless context requires otherwise, the terms "orient," "draw," and "stretch" are used interchangeably throughout, as are the terms "oriented," "drawn," and "stretched," and the terms "orienting," "drawing," and "stretching."

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and a non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/unsaturated ester copolymer, ethylene/unsaturated acid copolymer, (especially ethyl acrylate copolymer, ethylene/butyl acrylate copolymer, ethylene/methyl acrylate copolymer, ethylene/acrylic acid copolymer, ethylene/methacrylic acid copolymer), modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

Materials

Useful materials in the inventive films include but are not limited to thermoplastic polyolefins, including polyethylene and copolymers thereof and polypropylene and copolymers thereof. The olefin based polymers include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins. Other examples of polymers suitable for use as films include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber. This new class of rubber-like polymers may also be employed and they are generally referred to herein as metallocene polymers or polyolefins produced from single-cite catalysts. The most preferred catalysts are known in the art as metallocene catalysts whereby ethylene, propylene, styrene and other olefins may be polymerized with butene, hexene, octene, etc., to provide elastomers suitable for use in accordance with the principles of this invention, such as poly(ethylene-butene), poly(ethylene-hexene), poly(ethylene-octene), poly(ethylene-propylene), and/or polyolefin terpolymers thereof. It can be suitable to blend into the resin a suitable amount of a cling agent, such as polyisobutylene, to control the level of lamination during the lamination process.

As the term "high density polyethylene" (HDPE) is used herein, it is defined to mean an ethylene-containing polymer having a density of 0.940 or higher. (Density (d) is expressed as $g/cm^3$) One particularly suitable HDPE for use with the methods of the present invention is the resin sold as M6211 (d=0.958) by Equistar. Another particularly suitable HDPE is the resin sold as HD 7845.30 (d=0.958) by Exxon. Other suitable HDPE resins include, for example, BDM 94-25 (d=0.961) and 6573xHC (d=0.959) which are both available from Fina Oil and Chemical Co., Dallas, Tex. and Sclair 19C (d=0.951) and 19F (d=0.961) which are both available from Nova Corporation, Sarnia, Ontario, Canada.

The Melt Index (MI) of the HDPE useful according to the prevention is in the range of from about 0.01 to about 10. (Melt Index is expressed as g/10 min.) Melt index is generally understood to be inversely related to viscosity, and decreases as molecular weight increases. Accordingly, higher molecular weight HDPE generally has a lower melt index. Methods for determining melt index are known in the art, e.g., ASTM D 1238.

The term "low density polyethylene" (LDPE) as used herein is defined to mean an ethylene-containing polymer having a density of about 0.926 or lower and a MI of about 7. LDPE is readily available, e.g., PE 1017 (MI=7; d=0.917) from Chevron, San Francisco, Calif., SLP 9045 (MI=7.5; d=0.908) from Exxon, Houston, Tex., and ZCE 200 (MI=3; d=0.918) from Mobil Chemical Corporation, Fairfax, Va.

The term "very low density polyethylene" (VLDPE) as used herein is defined to mean an ethylene-based hexane copolymer having a density of from about 0.890 to about 0.915 and a MI of from about 3 to about 17. VLDPE is readily available from Exxon, e.g., Exact Plastomer SLP-9087 (MI=7.5; d=0.900) and Exact Plastomer SLP-9088 (MI=16.5; d=0.900). Other suitable VLDPE resins include, for example, product No. XPR 0545-33260 46L (MI=3.3; d=0.908) from Dow Chemical Company, Midland, Mich.

The term "linear low density polyethylene" (LLDPE) as used herein is defined to mean a copolymer of ethylene and a minor amount of an olefin containing 4 to 10 carbon atoms, having a density of from about 0.910 to about 0.926 and a MI of from about 0.5 to about 10. LLDPE is readily available, e.g., Dowlex® 2045.03 (MI=1.1; d=0.920) from Dow Chemical Company, Midland, Mich.

Film Forming Processes

These films can be made by a conventional flat or tubular cast extrusion or coextrusion, or other suitable process such as a blown film process to produce monolayer, bilayer, or multilayer films. If desired for a given end use, these films can be oriented by trapped bubble, tenterframe, or other suitable process. They can thereafter optionally be annealed. The films of the present invention are typically produced by the blown film or cast film process. The blown or cast film is formed by extrusion. For the blown film process, the film can be collapsed to double the plies of the film or the film can be cut and folded or cut and unfolded. The extruder is a conventional one using a die, which will provide the desired gauge. Some useful extruders are described in U.S. Pat. Nos. 4,814,135; 4,857,600; 5,076,988; 5,153,382; each of which are incorporated herein by reference. The gauge of the films of interest here can be in the range of about 0.1 to about 10 mils, suitably from about 0.2 to about 4 mils, and suitably in the range of about 0.3 to about 2 mils. Examples of various extruders, which can be used in producing the film of the present invention, are the single screw type modified with a blown film die and air ring and continuous take off equipment.

Film Stretching Processes

The films of the present invention typically undergo one or more film stretching processes under ambient or cold (non-heated) conditions. This differs significantly from most prior art processes where the film is stretched under heated conditions. Under heated conditions, the molecules in the film have more freedom to move about and align themselves to in an oriented fashion. Under ambient or cold conditions, the molecules in the film are more constrained and not as easily oriented. Therefore, different orientation structures and different film properties would be expected. There are three common ways to stretch thermoplastic films. One is referred to as machine direction orientation (MDO) which involves stretching the film between two pairs of smooth rollers. The film is pinched in the nip of a first pair of rollers, which are running at a relatively slow speed, and a second pair of rollers, downstream from the first pair, which are operating faster than the first pair. Because of the difference in run speeds, the film in between the roller pairs must either stretch or break to accommodate the difference. The ratio of the roller speeds will roughly determine the amount that the film is stretched. For example, if the first pair is running at 100 feet per minute (fpm) and the second pair is running at 300 fpm, the film will be stretched to roughly three times it original length. The MDO method stretches the film continuously in the machine direction (MD) only. The MDO stretching method is used to create an MD oriented film.

A second method of stretching is called tentering. In simplest terms, the tentering method involves grabbing the sides of the film and stretching it sideways. For many years this was the only way to stretch film from side to side, or in the transverse direction (TD). The tentering method tended to be slow and, because the forces are concentrated on the edges of the film, often the film did not stretch evenly. U.S. Pat. No. 4,704,238 discloses a tentering apparatus having a pre-heating zone and a stretching zone, followed by a heat setting zone to facilitate the stretching of a preformed blown or cast film.

A third method of stretching involves incremental stretching of thermoplastic film. This method is described in the early patent literature, for example, U.S. Pat. Nos. 4,153,751; 4,116,892; 4,289,832 and 4,438,167. In the practice of this method, the film is run between grooved or toothed rollers. The grooves or teeth on the rollers intermesh without touching when the rollers are brought together and, as the film passes between the rollers, it is stretched. Incremental stretching has the advantage of causing the film to stretch in many small increments that are evenly spaced over the entire film. This results in a more evenly stretched film, something that is not always true for continuous MDO stretching and is almost never true for tentering. Incremental stretching allows one to stretch the film in the MD, TD and at angle (DD or diagonal direction) or any combination of these three directions. The depth at which the intermeshing teeth engage controls the degree of stretching. Often, this incremental method of stretching is simply referred to as TD, MD, TD/MD or DD ring rolling. A number of U.S. patents have issued for incrementally stretching thermoplastic films and laminates. An early example of the patent art which discloses a method of incrementally stretching film is U.S. Pat. No. 5,296,184. Other relevant patents regarding the incremental stretching of thermoplastic films and laminates include U.S. Pat. Nos. 6,265,045; 6,214,147; 6,013,151; 5,865,926; 5,861,074; 5,851,937; 5,422,172 and 5,382,461.

Diagonal Intermeshing Stretcher (DD Ring Rolling)

The diagonal intermeshing stretcher consists of a pair of left hand and right hand helical gear-like elements on parallel shafts. The shafts are disposed between two machine side plates, the lower shaft being located in fixed bearings and the upper shaft being located in bearings in vertically slideable members. The slideable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

The intermeshing rolls closely resemble fine pitch helical gears. In the preferred embodiment, the rolls have 5.935" diameter, 45° helix angle, a 0.100" normal pitch, 30 diametral pitch, 14½° pressure angle, and are basically a long addendum topped gear. This produces a narrow, deep tooth profile which allows up to about 0.090" of intermeshing engagement and about 0.005" clearance on the sides of the tooth for material thickness. The teeth are not designed to transmit rotational torque and do not contact metal-to-metal in normal intermeshing stretching operation.

Transverse Direction Intermeshing Stretcher (TD Ring Rolling)

The TD intermeshing stretching equipment is identical to the diagonal intermeshing stretcher with differences in the design of the intermeshing rolls and other minor areas noted below. Since the TD intermeshing elements are capable of large engagement depths, it is important that the equipment incorporate a means of causing the shafts of the two intermeshing rolls to remain parallel when the top shaft is raising or lowering. This is necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the TD intermeshing stretcher must operate both upper and lower intermeshing rolls except in the case of intermeshing stretching of materials with a relatively high coefficient of friction. The drive need not be antibacklash, however, because a small amount of machine direction misalignment or drive slippage will cause no problem. The reason for this will become evident with a description of the TD intermeshing elements.

The TD intermeshing elements are machined from solid material but can best be described as an alternating stack of two different diameter disks. In the preferred embodiment, the intermeshing disks would be 6" in diameter, 0.031" thick, and have a full radius on their edge. The spacer disks separating the intermeshing disks would be 5½" in diameter and 0.069" in thickness. Two rolls of this configuration would be able to be intermeshed up to 0.231" leaving 0.019" clearance for material on all sides. As with the diagonal intermeshing stretcher, this CD intermeshing element configuration would have a 0.100" pitch.

Machine Direction Intermeshing Stretcher (MD Ring Rolling)

The MD intermeshing stretching equipment is identical to the diagonal intermeshing stretch except for the design of the intermeshing rolls. The MD intermeshing rolls closely resemble fine pitch spur gears. In the preferred embodiment, the rolls have a 5.933" diameter, 0.100" pitch, 30 diametral pitch, 14½° pressure angle, and are basically a long addendum, topped gear. A second pass was taken on these rolls with the gear hob offset 0.010" to provide a narrowed tooth with more clearance. With about 0.090" of engagement, this configuration will have about 0.010" clearance on the sides for material thickness.

Embossing

The film may additionally be embossed with a pattern that provides texture to the film, but with no additional overall stretching. The film may be embossed by feeding between two rolls, one or both of which have an embossing pattern. The rolls may be heated or unheated.

Slitting—Straight Slitting and Sinusoidal Slitting

The film may be slit in either a straight or sinusoidal fashion. The film may be slit immediately after the film production process, such as film extrusion or blown film process. The film may be slit at any point in the process of the invention, for example using slitting process described in U.S. Pat. No. 4,930,905 to Sharps, Jr., and hereby incorporated in its entirety herein.

Coating and Printing Functional Compositions

The film may be coated or printed with an ink, adhesive, or other functional compound, such as a fragrance. Depending upon the composition, various coating and printing process may be appropriate. For instance, in addition to ink jet printing and other non-impact printers, the composition can be used in screen printing processes, offset lithographic processes, flexographic printing processes, rotogravure printing processes, and the like. In other cases, a coating process may be appropriate. In the gravure coating process, an engraved roller runs in coating bath which fills the engraved recesses in engraved roller with excess additive delivery slurry. The excess slurry on engraved roller is wiped off engraved roller by doctor blade, with engraved roller thereafter depositing additive delivery slurry layer onto substrate film as substrate film passes between engraved roller and pressure roller. In the 3-roll reverse roll coating process, additive delivery slurry is measured onto application roller by gap between upper metering roller and application roller. The coating is "wiped off" application roller by substrate film as substrate passes around support roller, leaving a desired layer of slurry on substrate. Additive delivery slurry is confined on metering roller by doctor blade. In the Meyer rod coating process, an excess coating of the additive delivery slurry is deposited onto substrate film as substrate film passes over bath roller, which is immersed in bath containing the additive delivery slurry. Wire-wound Meyer rod allows a desired quantity of the coating to remain on substrate film. The quantity of coating remaining is determined by the diameter of the wire used on Meyer rod, as well as the distance of the surface of the wire from the substrate film. Although the wire can be in contact with substrate film, alternatively the wire can be spaced from substrate film by, for example, 1 to 10 mils, or 2 to 6 mils. In the extrusion coating process, additive delivery slurry is extruded through slot, forming coating on substrate. In the curtain coating process, a bath containing additive delivery slurry has slot in its base, allowing continuous curtain of additive delivery slurry to fall towards gap between conveyors. Substrate is passed along the conveyors at a controlled speed, receiving coating thereon. In the air knife coating process, excess coating is applied to substrate, with the excess coating being reduced to a desired coating by the gas flow emanating from blower. In the rotary screen printing process, a squeegee presses additive delivery slurry through holes in rotary screen. Substrate is passed through a nip between rotary screen and counter pressure roller, resulting in printed substrate.

Corona Treatment for Adhesion

The film surface may be activated for greater adhesion be corona, flame or ozone. Corona treatment is generally a means for modifying the surface of a given material, particularly a macromolecular material, by virtue of corona discharge in the air under a pressure of not less than 100 mmHg, generally, under the atmospheric pressure. It is useful for enhancing such properties as adhesion. Since a trace amount of ozone gas is generated by corona discharge when the corona treatment is performed, this ozone gas can be used for causing the forced oxidation of the surface of the high-pressure polyethylene by blowing this ozone gas against the high-pressure polyethylene in a molten state. As described in U.S. Pat. No. 6,254,736 to Kitchel, the application of corona treatment serves to increase the surface energy of the portion of a surface encouraging better adhesion. For example, corona treatment may be applied at Watt densities ranging from about 20 to about 90 watts per centimeter per second (W/cm/s) with an arc gap of about 1 millimeter (0.040 inch). In a suitable method, the corona treatment is applied in blanket form over the surface of the film.

Orientation

The present state of the art related to the strengthening of films or laminates has developed techniques for uniaxially or biaxially orienting films to improve overall strength, stiffness and tear resistance. It is known in the prior art that by stretching a film in one direction, this uniaxially orients the molecules of the film in the direction of stretch. By doing so, improved tear resistance and stiffness properties result in the direction transverse to the axis of stretching. Similarly, biaxial orientation can be accomplished in numerous ways. Particularly, a film can be simultaneously stretched along two axes thereby providing improved stiffness and strength in two distinct directions. Another method of providing a biaxially oriented laminated sheet is by uniaxially stretching one sheet and laminating it to a oppositely oriented uniaxial sheet. This provides a composite biaxial oriented film. Still, another way to biaxially orient a sheet is to uniaxially orientate the film, slit the film along a bias, and then laminate the film in such a manner as to have the orientation of one layer be oppositely disposed to the orientation of the second layer. Lamination of films of different orientations allows for a rebalance of film properties, for example the tear properties in both the transverse direction and the machine direction. Under normal continuous lamination techniques, the resulting laminate properties may only be additive based on the orientation of the orientation of each laminate layer. In addition, the laminate may tear or puncture based on the tear or puncture resistance of the weakest lamination layer.

Discontinuous Lamination Processes

Discontinuous lamination refers to lamination of two or more layers where the lamination is not continuous in the machine direction and not continuous in the transverse direction. More particularly, discontinuous lamination refers to lamination of two or more layers with repeating bonded patterns broken up by repeating unbonded areas in both the machine direction (MD) and the transverse direction TD of the film, or in the corresponding width 11 (from side to side of a trash bag 10) and height 12 (from the top 13 to the bottom 14 of a trash bag 10) as shown in FIGS. 1A-1D, where the squares 15, diamonds 16, and circles 17 represent the bonded areas of two layers, or three layers, or four layers, or more than four layers. In other embodiments, the machine direction (MD) and transverse direction (TD) may not correspond to the width and height respectively of the article. In some suitable embodiments, such as FIGS. 1A-1C, each bonded pattern should have a largest TD patterned width 18 in the transverse direction (TD) of less than 25% of the transverse width 19 of the patterned film, or less than 20% of the transverse width of the film, or less than 10% of the transverse width of the patterned film, or less than 5% of the transverse width of the film. In some embodiments, the bonded patterns should have a largest MD patterned width 20 in the machine direction of less than 25% of the machine width 21 of the patterned film, or less than 20% of the machine width of the film, or less than 10% of the machine width of the film, or less than 5% of the transverse width of the film. In some suitable embodiments, such as FIGS. 1A-1C, each bonded pattern should have a largest TD patterned width 18 in the transverse direction (TD) of less than 25% of the transverse width of the article, or less than 20% of the transverse width 12 of the article 10, or less than 10% of the transverse width of the article, or less than 5% of the transverse width of the article. In some embodiments, the bonded patterns should have a largest MD patterned width 20 in the machine direction of less than 25% of the machine width 11 of the article 10, or less than 20% of the machine width of the article, or less than 10% of the machine width of the article, or less than 5% of the transverse width of the article. In suitable examples, the width 18 of the bonded patterns in the transverse direction is greater than the width 22 of the unbonded areas in the transverse direction. In suitable examples, the width 20 of the bonded patterns in the machine direction or direction perpendicular to the transverse direction is greater than the width of the unbonded areas 23 in the machine direction or direction perpendicular to the transverse direction.

Figure 1B:
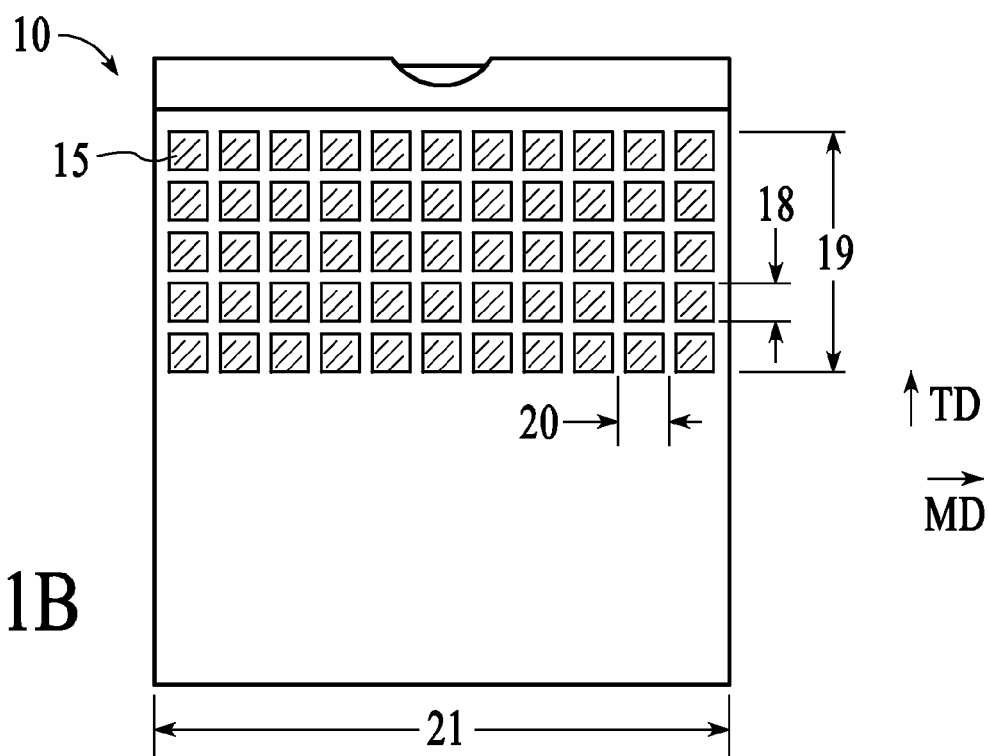
Figure 1C:
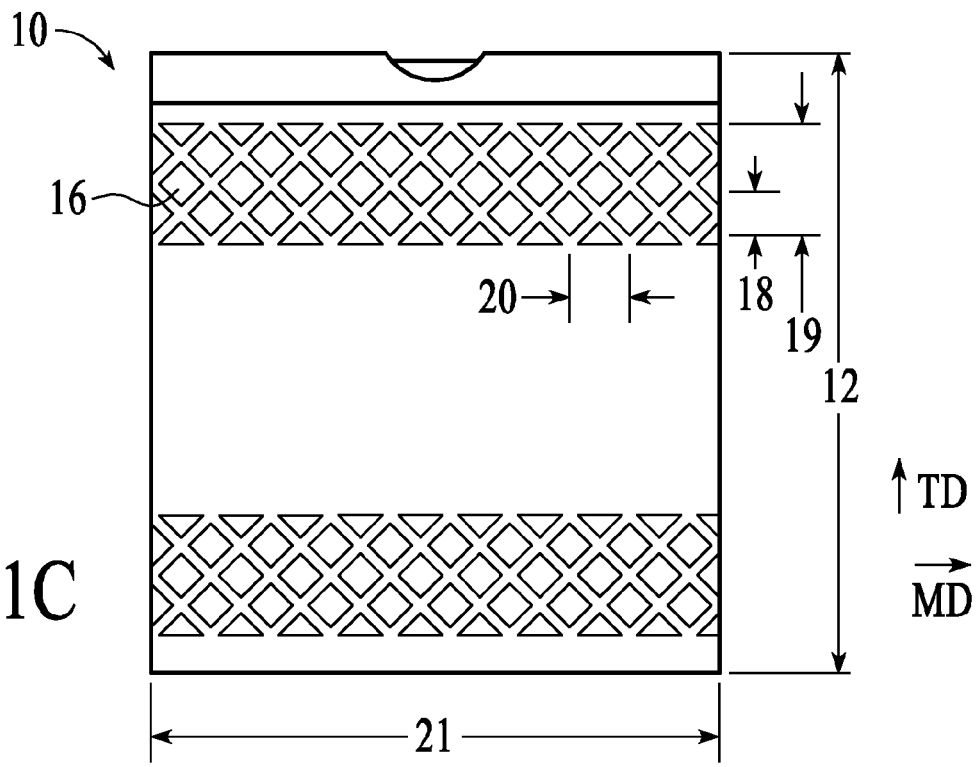
Figure 1D:
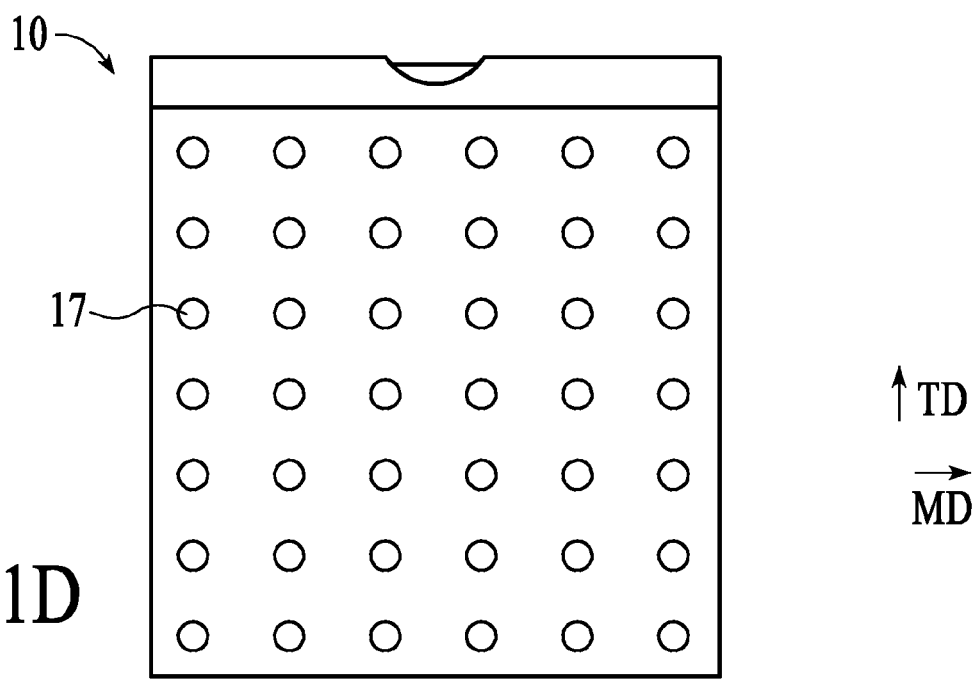
Figure 1E:
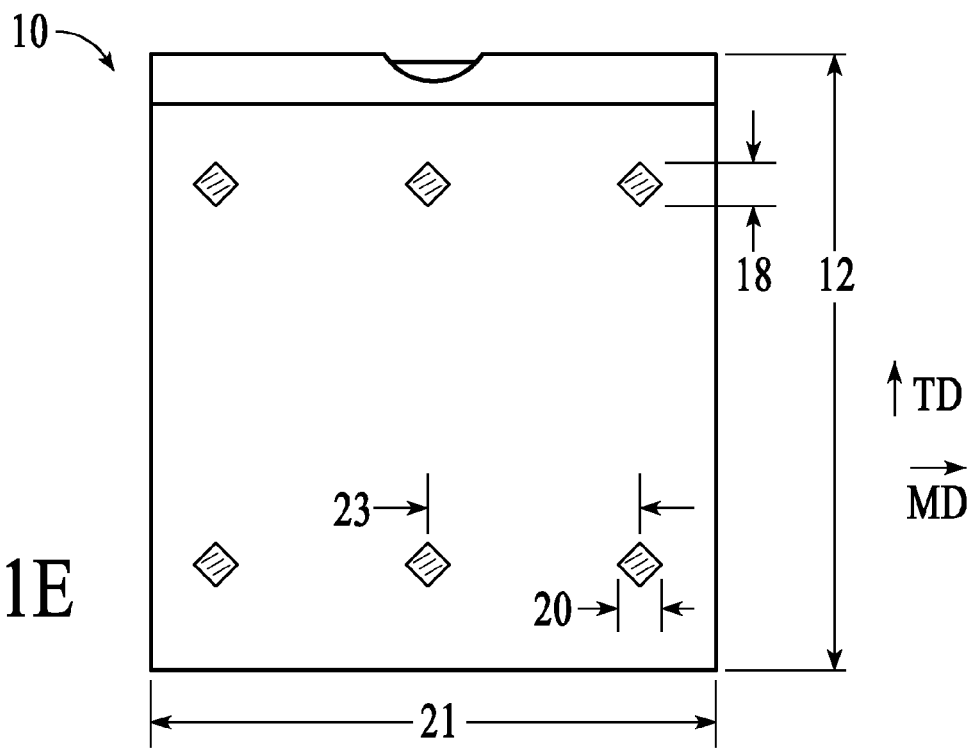

The bonded areas of discontinuous lamination can also suitably be large in comparison to unbonded areas, for example in FIGS. 1A-1C. For example, bonded areas of discontinuous lamination can represent at least 50% of the total area of the section where the discontinuous lamination occurs, or at least 60% of the total area of the section where the discontinuous lamination occurs, at least 70% of the total area of the section where the discontinuous lamination occurs, at least 80% of the total area of the section where the discontinuous lamination occurs. In other embodiments, for example in FIGS. 1D-1E, the bonded areas of discontinuous lamination can represent substantially less than 50% of the total area of the section where the discontinuous lamination occurs, or less than 40% of the total area of the section where the discontinuous lamination occurs, or less than 30% of the total area of the section where the discontinuous lamination occurs, or less than 10% of the total area of the section where the discontinuous lamination occurs.

Numerous methods can be used to provide adequate lamination in the bonded discontinuous lamination areas of these films. The separate film layers can be physically laminated by pressure (for example MD ring rolling, TD ring rolling, stainable network lamination, or embossing), or with a combination of heat and pressure. Alternately, the film layers can be laminated by ultrasonic bonding. Alternately, the films can be coated within discontinuous areas with adhesives. Treatment with a Corona discharge can enhance any of the above methods. Prior to lamination, the separate layers can be flat film or can be subject to any of the separate processes described above, such as stretching, slitting, coating and printing, and corona treatment.

The discontinuous lamination process can take place with the addition of heating one or more of the lamination layers or the process can be accomplished substantially without heating in a cold deformation process. The discontinuous laminate may provide improved properties compared to a continuous laminate or a non-laminate film. Providing a film stretching process, as described above, to one or more film layers and then laminating under a discontinuous laminate process to form a discontinuous laminate of stretched film can provide a significant improvement of all properties over a discontinuous laminate formed from one or more film layers, where none of the layers has been modified by a film stretching process. For example, the discontinuous laminate may provide improved tear and impact properties.

Partially Discontinuous Lamination Processes

Figure 1F:
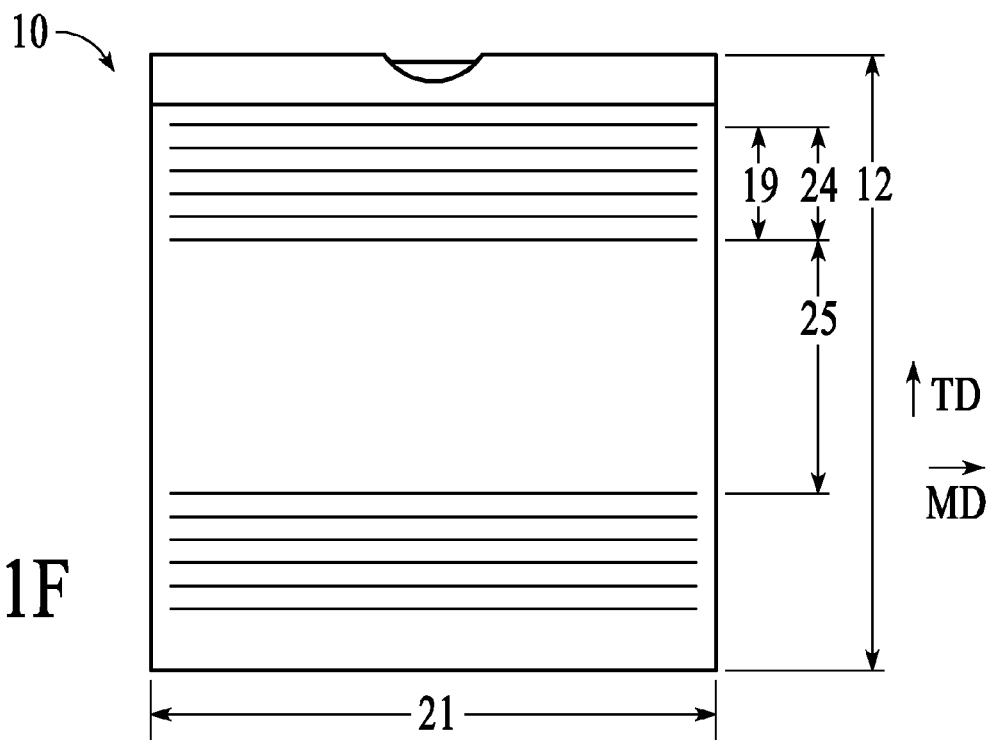
Figure 1G:
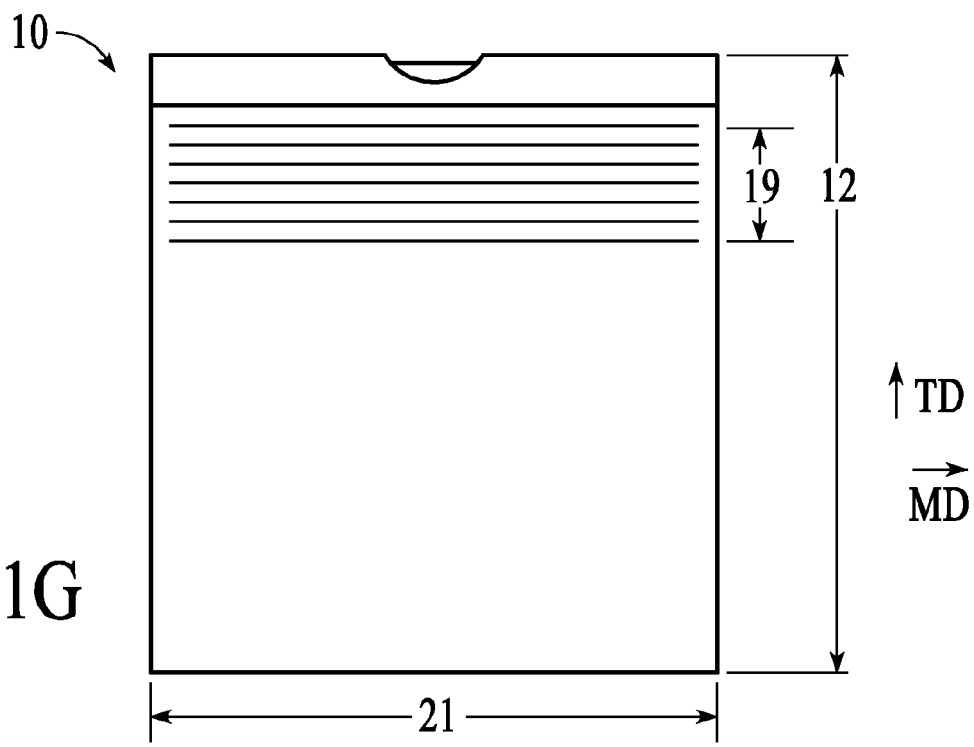
Figure 1H:
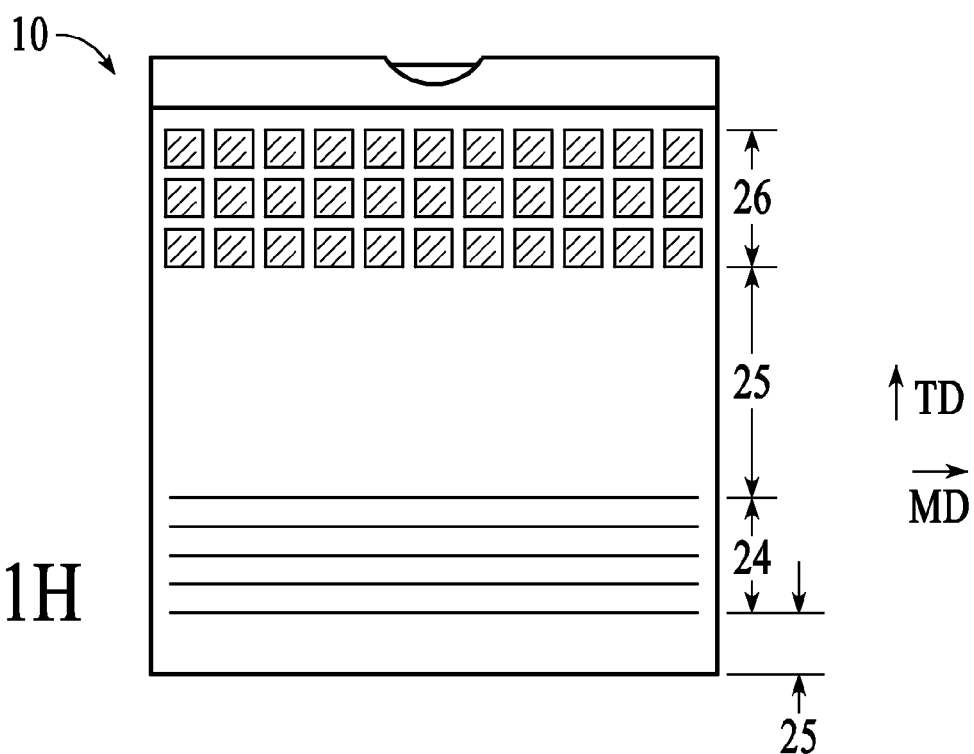

Partially discontinuous lamination refers to lamination of two or more layers where the lamination is substantially continuous in the machine direction or in the transverse direction but not continuous in either the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbonded areas in either the machine direction or the transverse direction, as shown in FIGS. 1F-1G. In FIG. 1H, there is a combination of discontinuous lamination near the top of the bag and partially discontinuous lamination near the bottom of the bag. The partially discontinuous lamination may be achieved by ring-rolling. FIG. 1F shows a multi-layer bag that has been ring rolled near the top and bottom of the bag to form an extended ribbing pattern across the width of the bag. In this case the extended ribbing pattern covers most of the width of the bag without any intermittent unbonded areas breaking up the bonded extended ribbing pattern. The middle section of the bag represents an unbonded region between another extended ribbing pattern across the bag near the bottom. The ring-rolling process can result in partial discontinuous lamination where the pressure of the ring rolls (or the heat of the process where the process done under heated conditions) causes the film layers to partially bond.

Embossing Discontinuous Lamination

Techniques for embossing one or more layers of film are typically known in the industry. The embossed, laminated film layers of the present invention may be prepared by any suitable means by utilizing two or more layers of preformed web of film and passing them between embossing rollers. The film layers may be heated prior to or during the embossing process, or the embossing process may be a cold deformation process. The method of embossing multiple layers of film of the present invention can involve calendar embossing two or more non-laminated layers with discrete "icons" to form bonded areas or icons, each icon having a bonded length and separated from adjacent icons by an equivalent unbonded length. By "icon" as used herein is meant a single, discrete, design or shape, such as a heart, square, triangle, diamond, trapezoid, circle, formed essentially as a line drawing. While certain icons may have portions not describable as a "line" (such as eyes of animals, etc.), the overall design comprises primarily lines in a pattern to make the design or shape. In one example in FIG. 1B, the embossed icons are squares. In suitable examples, the bonded icon area is larger than the unbonded area around the icons. The bonded icon area can represent greater than 50%, or greater than 60%, or greater than 70%, or greater than 80% of the total embossed area. Prior to embossing discontinuous lamination, the separate layers can be flat film or can be subject to any of the separate processes described above, such as stretching, slitting, coating and printing, and corona treatment.

Strainable Network Discontinuous Lamination

Figure 2:
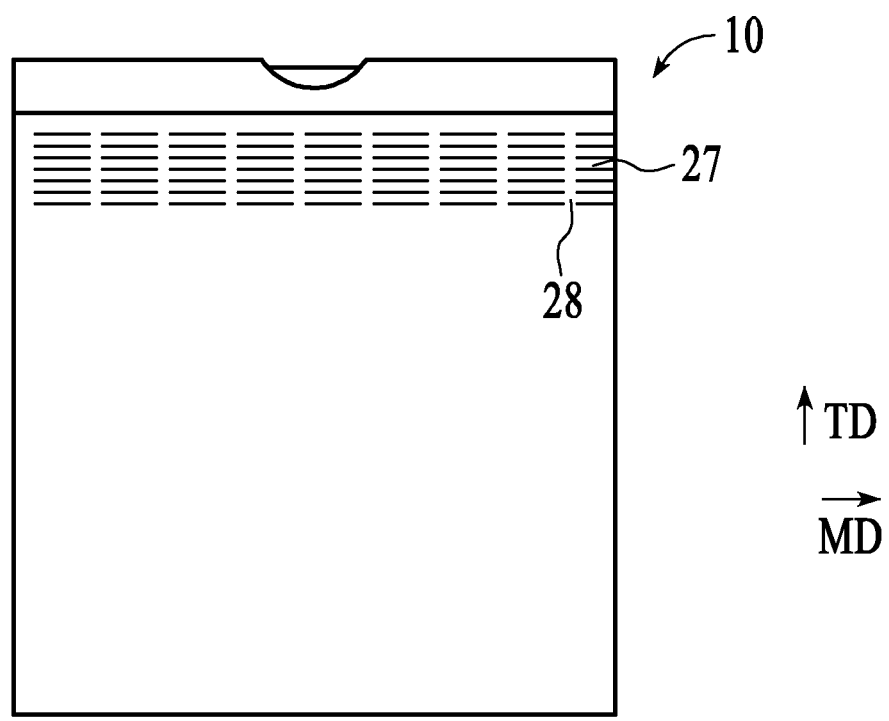
FIG. 2 is a front view of thermoplastic bag having a draw tape.

One suitable example of discontinuous lamination is the lamination of two or more layers of material to form a strainable network laminate, where U.S. Pat. No. 5,518,801 to Chappell et al., incorporated in its entirety by reference herein, describes the process to form a strainable network from a single layer of film material. As shown in FIG. 2, the discontinuous strainable network laminate has at least two distinct and dissimilar regions, corresponding to a bonded strainable network region of substantially parallel rib-like elements and a non-bonded region between the bonded strainable network region. The non-bonded region may undergo a molecular-level deformation in response to an applied strain in a direction substantially parallel to strain axis before a substantial portion of the non-bonded region undergoes any substantial molecular-level deformation. As used herein, the term "substantially parallel" refers to an orientation between two axes whereby the subtended angle formed by the two axes or an extension of the two axes is less than 45°. In the case of a curvilinear element it may be more convenient to use a linear axis which represents an average of the curvilinear element. The bonded strainable network regions initially undergo a substantially geometric deformation in response to an applied strain in a direction substantially parallel to the axis.

In a suitable embodiment, the bonded strainable network region is comprised of a plurality of raised rib-like elements. As used herein, the term "rib-like element" refers to an embossment, debossment or combination thereof which has a major axis and a minor axis. Suitably, the major axis is at least as long as the minor axis. The major axes of the rib-like elements are suitably oriented substantially perpendicular to the axis of applied strain. The major axis and the minor axis of the rib-like elements may each be linear, curvilinear or a combination of linear and curvilinear. As used herein, the term "substantially perpendicular" refers to an orientation between two axes whereby the subtended angle formed by the two axes or an extension of the two axes is greater than 45 degrees. In the case of a curvilinear element it may be more convenient to use a linear axis which represents an average of the curvilinear element.

The rib-like elements allow the bonded strainable network region to undergo a substantially "geometric deformation" which results in significantly less resistive forces to an applied strain than that exhibited by the "molecular-level deformation" of the non-bonded region. As used herein, the term "molecular-level deformation" refers to deformation which occurs on a molecular level and is not discernible to the normal naked eye. That is, even though one may be able to discern the effect of molecular-level deformation, e.g., elongation of the discontinuous film laminate, one is not able to discern the deformation which allows or causes it to happen. This is in contrast to the term "geometric deformation". As used herein the term "geometric deformation" refers to deformations of the discontinuous film laminate which are generally discernible to the normal naked eye when the discontinuous laminate or articles embodying the discontinuous laminate are subjected to an applied strain. Types of geometric deformation include, but are not limited to bending, unfolding, and rotating.

The discontinuous strainable network laminate may provide improved properties compared to a continuous laminate or a non-laminate film. Providing a film stretching process, as described above, to one or more film layers and then laminating under a strainable network process to form a discontinuous strainable network laminate of stretched film can provide a significant improvement of all properties over a strainable network laminate formed from one or more film layers, where none of the layers has been modified by a film stretching process. For example, the discontinuous laminate may provide improved tear and impact properties.

Another suitable example of discontinuous lamination is the lamination of two or more layers of material to form a strainable network laminate using a process similar to that described in U.S. Pat. App. 2006/0093766 to Savicki et al., incorporated in its entirety by reference herein, describes the process of forming a strainable network of a single or multiply film and converting that film to a flexible bag. In the invention, the bag could be formed from two or more layers of a single or multi-ply film discontinuously laminated by a strainable network process disclosed in Savicki.

Figure 3:
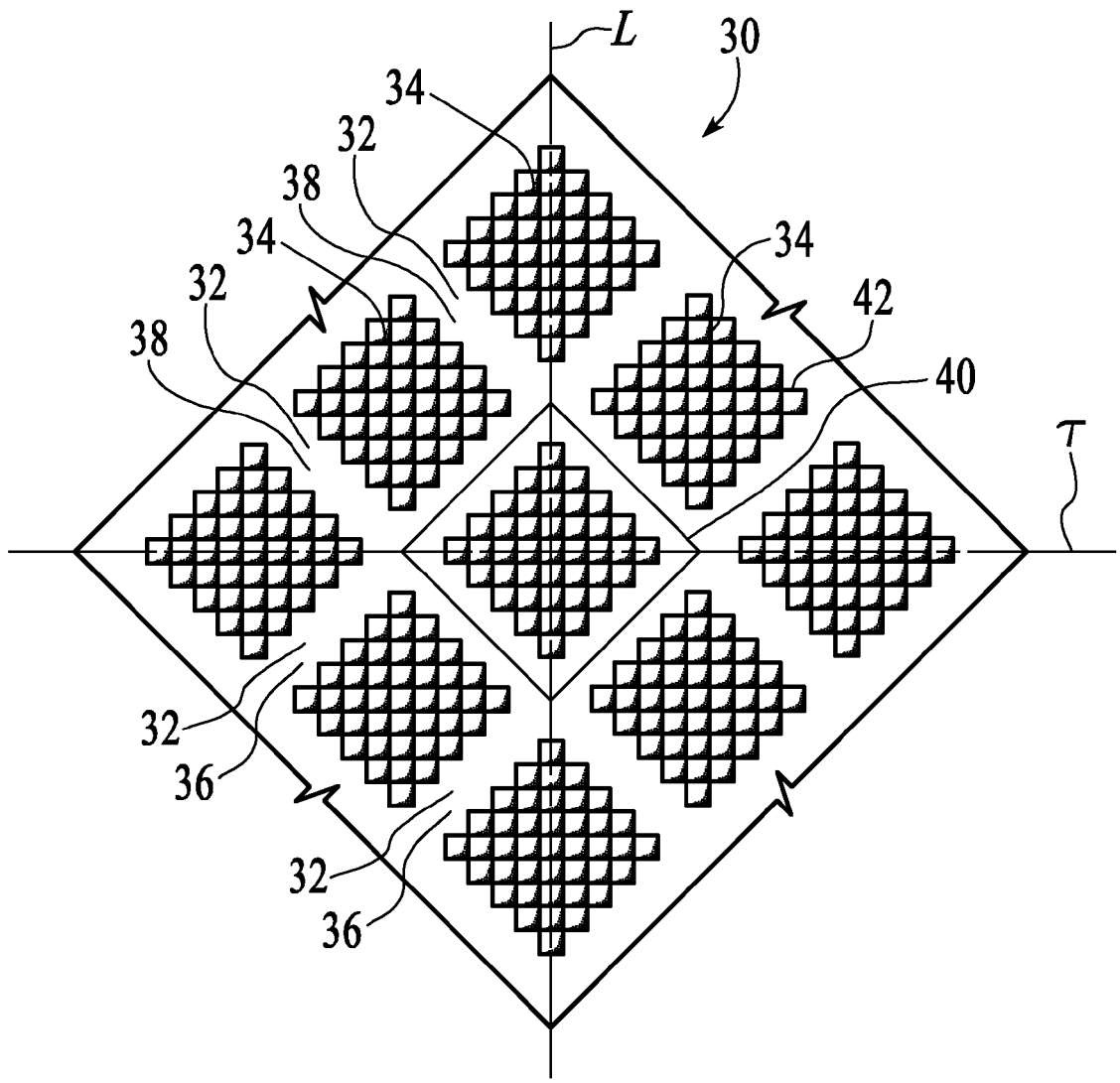
FIG. 3 is a section of the lamination portion of 1C.

Referring to FIG. 3, a discontinuous laminate material 30 of two or more film layers, where at least one of the film layers has undergone a film stretching process as described above, illustrating the present invention is shown in which the discontinuous laminate material is formed with a "strainable network" of distinct regions. As used herein, the term "strainable network" refers to an interconnected and interrelated group of areas which are able to be extended to some useful degree in one direction, suitably a predetermined direction or a plurality of predetermined directions, providing the discontinuous laminate material 30 with an elastic-like behavior in response to an applied and subsequently released strain force. The strainable network laminate includes a plurality of unbonded areas 32 that define a first region and a plurality of bonded areas 34 that define a second region. Portions of the unbonded areas 32, indicated generally as 36, extend in a first direction and are suitably substantially linear. Remaining portions of the unbonded areas 32, indicated generally as 38, extend in a second direction that is substantially perpendicular to the first direction, and the remaining portions 38 of the unbonded areas 32 are suitably substantially linear. While it is preferred that the first direction be perpendicular to the second direction, other angular relationships between the first direction and the second direction may be suitable. Suitably, the angles between the first and second directions ranges from about 45° to about 135°, with 90° being the most preferred. Intersecting sections of the portions 36 and 38 of the unbonded areas 32 form boundaries 40 (only one shown in FIG. 3), indicated by a phantom line in FIG. 3, which completely surround the bonded areas 34. It should be understood that the boundaries 40 are not limited to the square shape illustrated herein and that boundaries 40 may comprise other shapes as required by the particular configuration of the unbonded and bonded areas 32, 34.

Figure 4:
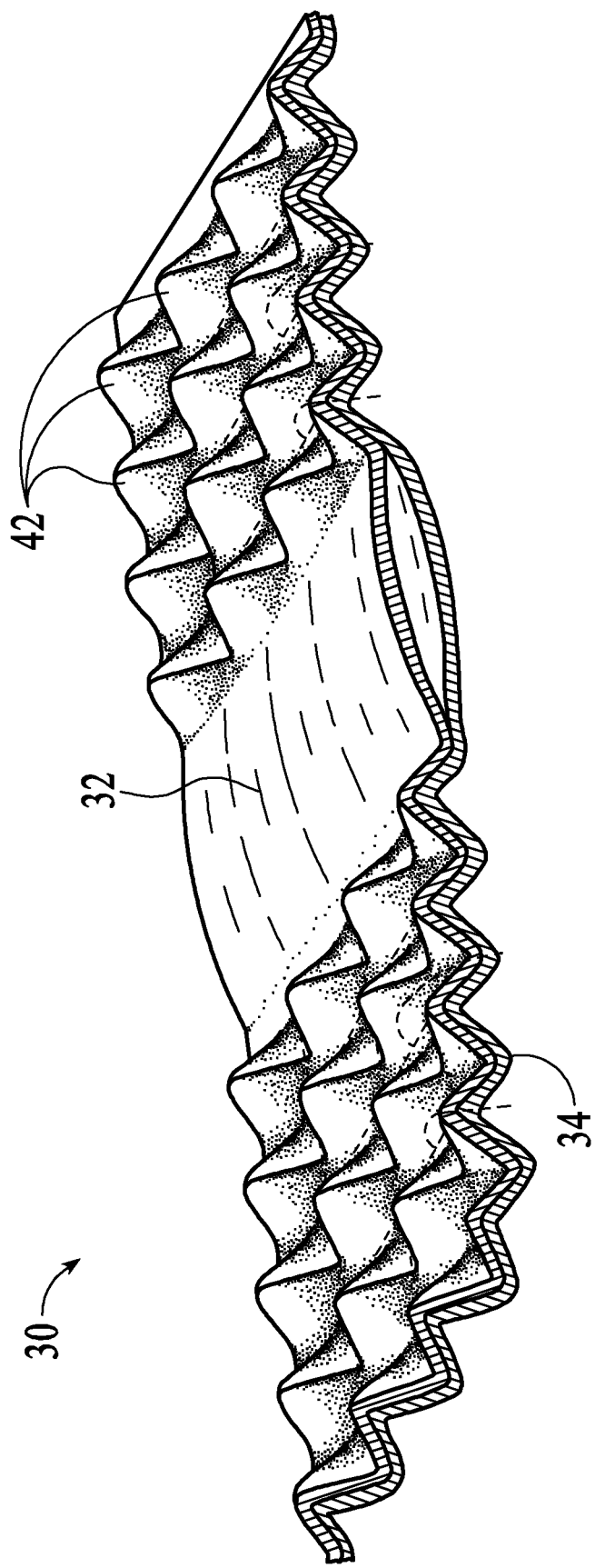
FIG. 4 is a cross-sectional view of a section of the portion of FIG. 3.

The discontinuous laminate material 30 shown in FIG. 3 comprises a multi-directional strainable network laminate providing stretch characteristics in multiple directions of strain, as provided by at least two distinct and dissimilar regions comprised of the same material composition. A first region comprises unbonded areas 32 generally illustrated as bands of unformed material generally lying in a plane defined by the discontinuous laminate material 30. A second region comprises bonded areas 34 generally defined by nub-like patterns 42 (see FIG. 4) extending out of the plane of the discontinuous laminate material 30 and comprised of a pattern extending in first and second distinct directions as formed by first and second superimposed patterns, where the patterns are illustrated as being substantially similar to each other. However, those skilled in the art will appreciate that other patterns are possible. It should be understood that the term "pattern" is intended to include continuous or discontinuous sections of patterns, such as may result, for example, from the intersection of first and second patterns with each other and which may result in patterns 42 aligned in columns and rows aligned in the directions of the first and second patterns. As described further below, the first and second patterns suitably are oriented substantially parallel to the longitudinal axis L and transverse axis T, respectively, of the discontinuous laminate material 30. Further, it should be noted for the purposes of the description given herein that the term "patterns" are not limited to plural patterns and may include one or more patterns. Also, the use of the term "areas", i.e., unbonded and bonded areas 32, 34, is not intended to be limited to plural areas and may include one or more areas defining the respective unbonded and bonded regions.

As used herein, the term "formed" refers to the creation of a desired structure or geometry upon a discontinuous laminate material 30 that will substantially retain the desired structure or geometry when it is not subjected to any strains or externally applied forces. The discontinuous laminate material 30 of the present invention is formed such that the unbonded areas 32 are visually distinct from the bonded areas 34. As used herein, the term "visually distinct" refers to features of the discontinuous laminate material 30 which are readily discernible to the normal naked eye when the discontinuous laminate material 30 or objects embodying the discontinuous laminate material 30 are subjected to normal use.

Figure 5:
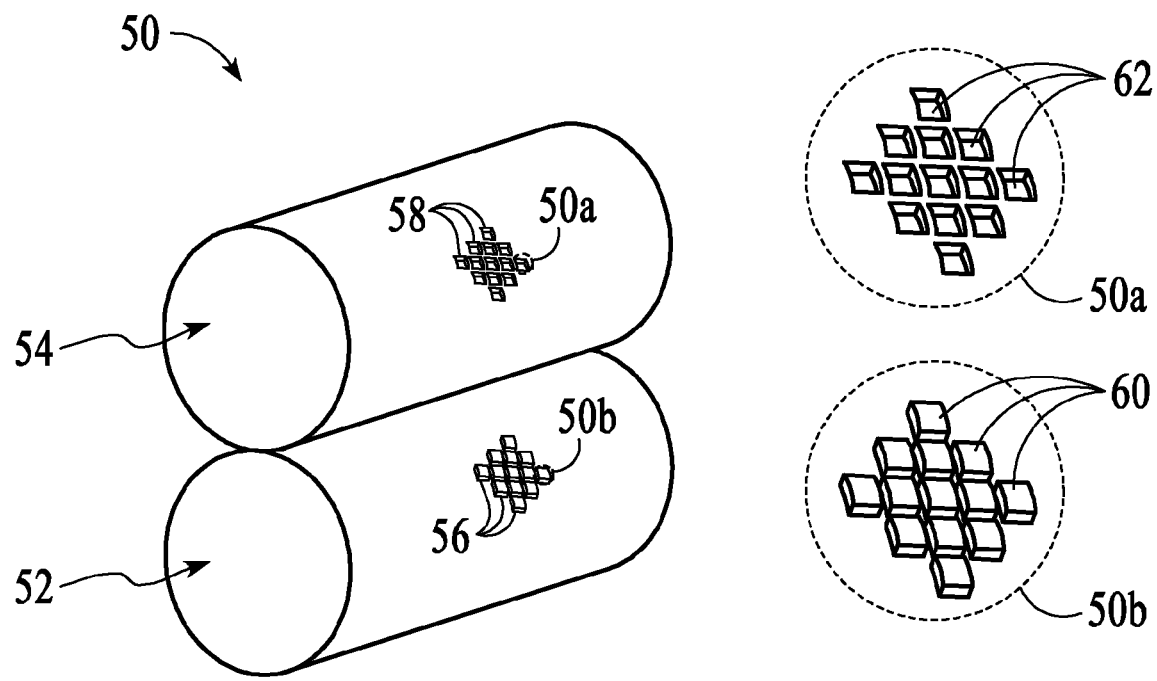
FIG. 5 is a view of a processing step of the invention.

FIG. 5 illustrates a roll configuration for forming the multi-directional strainable network laminate in a single pass through a set of meshing rolls 50. The meshing rolls 50 comprise punch roll 52 and a cooperating die roll 54, where the punch roll is provided with punch regions 56 and the die roll is provided with corresponding die regions 58 for cooperating with the punch regions 56. Further, the punch regions 56 are each provided with a plurality of punch elements 60 for cooperating with corresponding die elements 62 in the die regions 58, where cooperating engagement of the punch elements 60 with the die elements 62, with a sheet material therebetween, forms a bonded pattern on the material. Alternatively, the cooperating die roll 54 may comprise a conformable surface for conforming to the punch elements 60, or other surface configuration of the punch roll 52.

Figure 6:
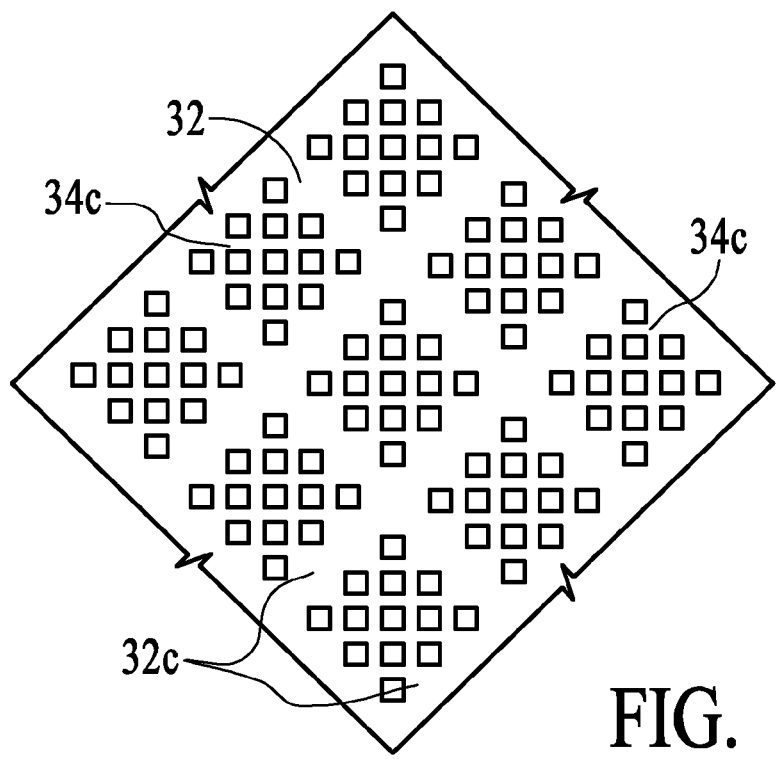
FIG. 6 is a section formed by the processing step of FIG. 5

Referring to FIG. 6, a pattern formed by the rolls 52, 54 is illustrated in which each of the bonded areas 34c of the multi-directional strainable network laminate is formed by a cooperating set of punch and die elements 60, 62, such as is illustrated in the enlarged surface views of FIG. 5, and the remaining unformed areas define the unbonded areas 32c of the multi-directional strainable network laminate.

It should be understood that the present invention is not limited to the particular described patterns, and that various patterns may be applied to provide the discontinuous laminate material 30 with a strainable network laminate. The present invention is not limited to a particular described orientation of the patterns relative to the laminate material 30. It should also be understood that the patterns defined in the bonded areas 34 of the strainable network may vary within the strainable network laminate. For example, certain ones of the bonded areas 34 may be formed with patterns extending in a single direction, and other ones of the bonded areas may be provided with patterns extending in a different direction. In such a strainable network laminate the differently oriented patterns may be separately located in different ones of the bonded areas 34. Additionally, the bonded areas 34 may be provided with different shapes than the essentially square or diamond shape illustrated herein. For example, the bonded areas may comprise any shape including, without limitation, circular, elliptical, oval, or any number of multi-sided or polygonal shapes. Alternative shapes for the patterns 42 may also be provided. Prior to strainable network discontinuous lamination, the separate layers can be flat film or can be subject to any of the separate processes described above, such as stretching, slitting, coating and printing, and corona treatment.

Figure 7:
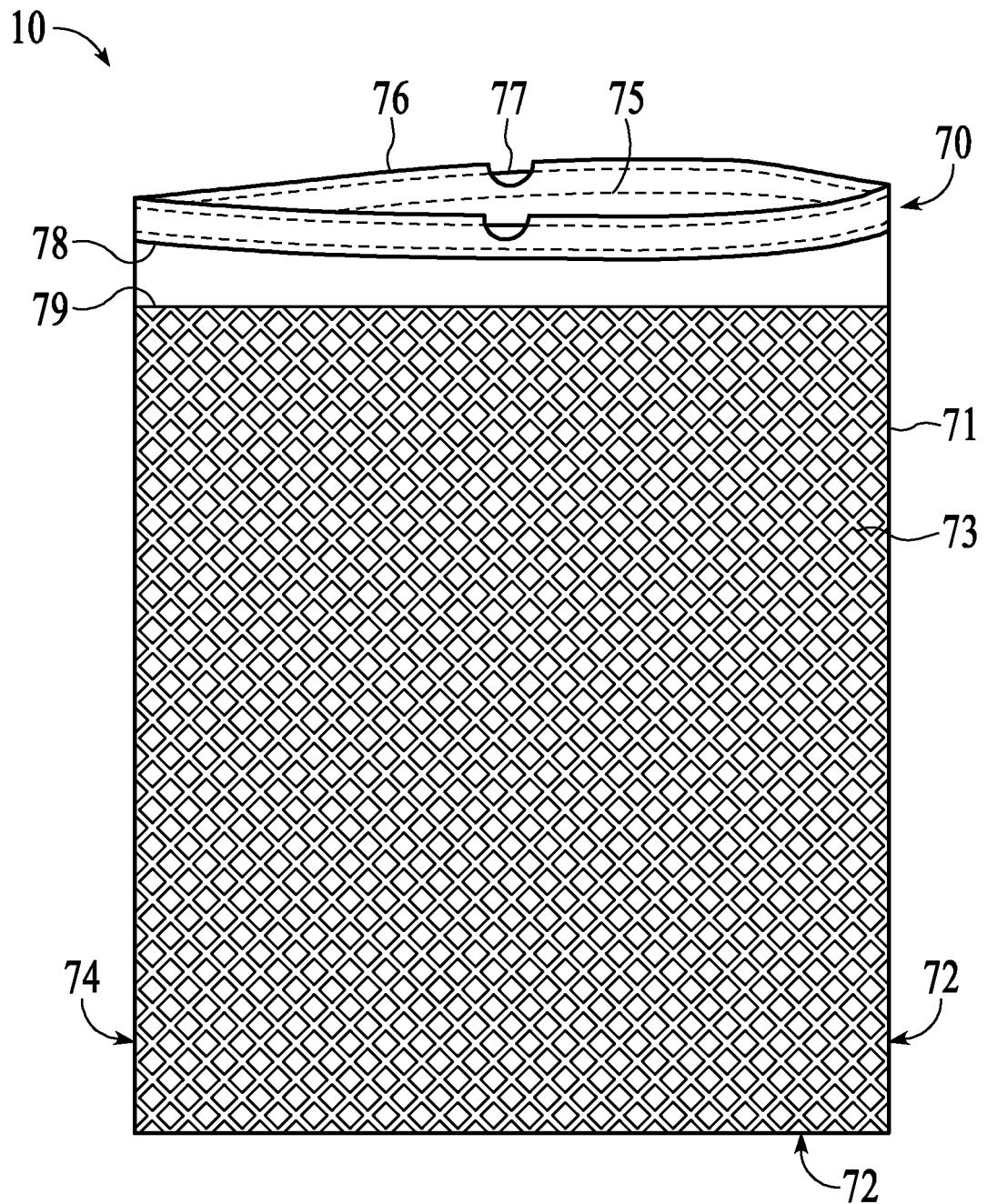
FIG. 7 is a perspective view of a bag of the invention.

Referring to FIG. 7, in a particular application of the present invention, the laminate material 30 illustrated in FIG. 3 may be incorporated in a bag construction, such as a flexible draw tape bag 70. The bag 70 includes a bag body 71 formed from a piece of multi-ply laminate material 30 folded upon itself along bag bottom 72 and bonded to itself along side seams 73 and 74 to form a semi-enclosed container having an opening 75 along an upper edge 76. The bag 70 also optionally includes closure means 77 located adjacent to the upper edge 76 for sealing edge 78 to form a fully-enclosed container or vessel. The closure means 77 can be supplied as flaps, adhesive tapes, a tuck and fold closure, an interlocking closure, a slider closure, a zipper closure or other closure structures known to those skilled in the art for closing a bag. The bag 70 is suitable for containing and protecting a wide variety of materials and/or objects contained within the bag body 71. In one embodiment of the bag 70, the discontinuous strainable network laminate area goes from the bag bottom 72 to an upper area 79 just below the closure means 77 and the bag opening 75. Alternatively, selected areas of the bag 70 may be preferentially provided with the strainable network laminate, while other areas of the bag 70 may comprise unbonded sheet material or continuously bonded laminate, such that the bag 70 includes preferentially discontinuously laminated areas. For example, the strainable network discontinuous laminate may be provided to one or more of different regions vertically located along the bag (i.e., top region, middle region, lower region) to thereby provide a particular region, or regions, with a desired physical characteristic.

In addition to providing the laminate material 30 of the bag 70 with an expansion characteristic, expanding the volume of the bag, the multidirectional strainable network discontinuous laminate of the present invention also improves the resistance of the laminate material 30 to puncture from the contents of bag 70 and/or from external objects. Further, the strainable network discontinuous laminate is resistant to propagation of tears through the laminate material 30 in that the bands defined by the unbonded areas 32 operate as interference zones to resist further propagation of a tear.

It should be understood that the above description of a bag formed of the laminate material 30 of the present invention is only one example of an application of the laminate material 30. Other examples of articles which may implement an application of the laminate material 30 include, without limitation, diapers, sanitary napkins, bandages, wrapping materials, packing materials, food storage bags, food storage containers, thermal heat wraps, facial masks, wipes and hard surface cleaners.

Figure 8:
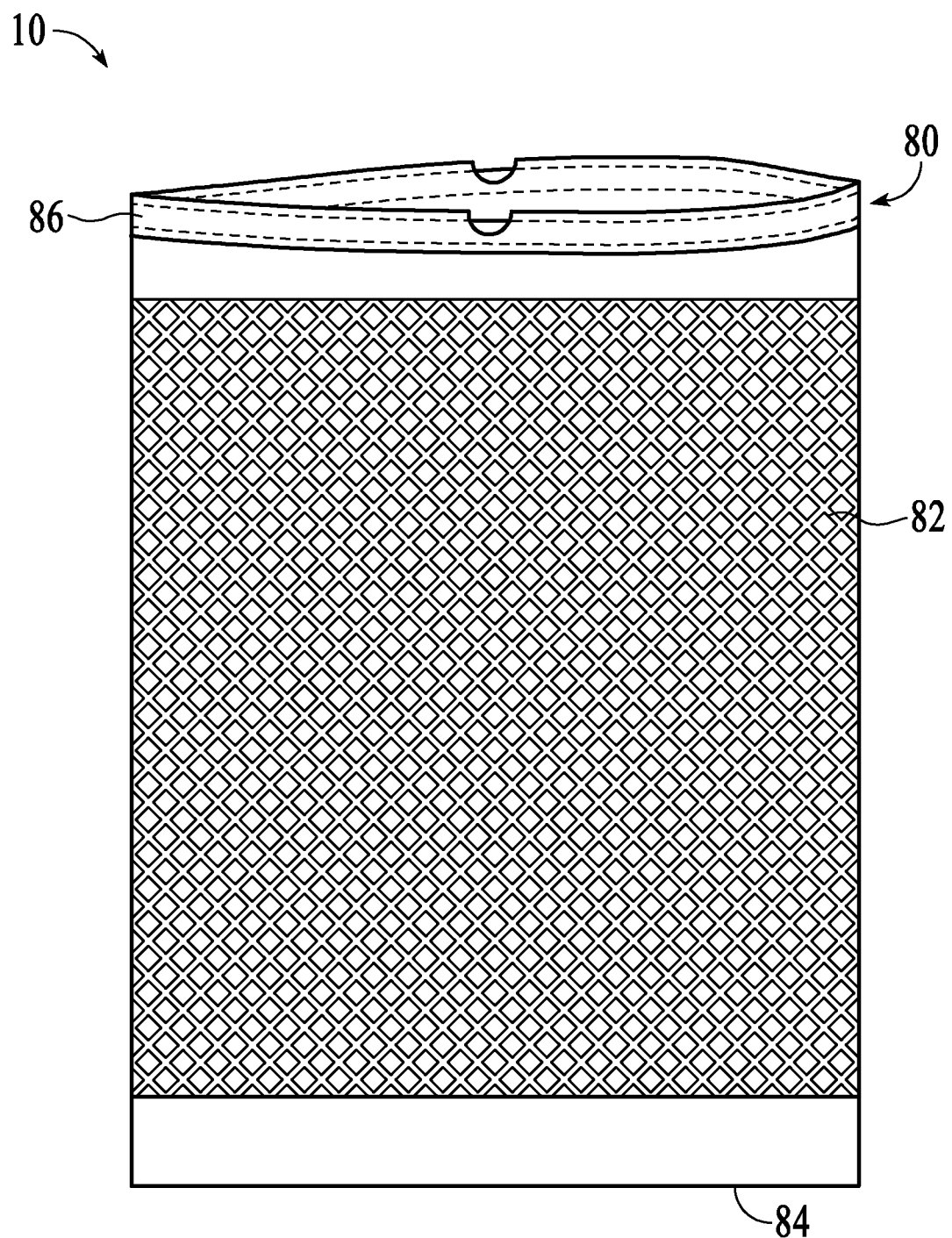
FIG. 8 is a perspective view of a bag of the invention.
Figure 9:
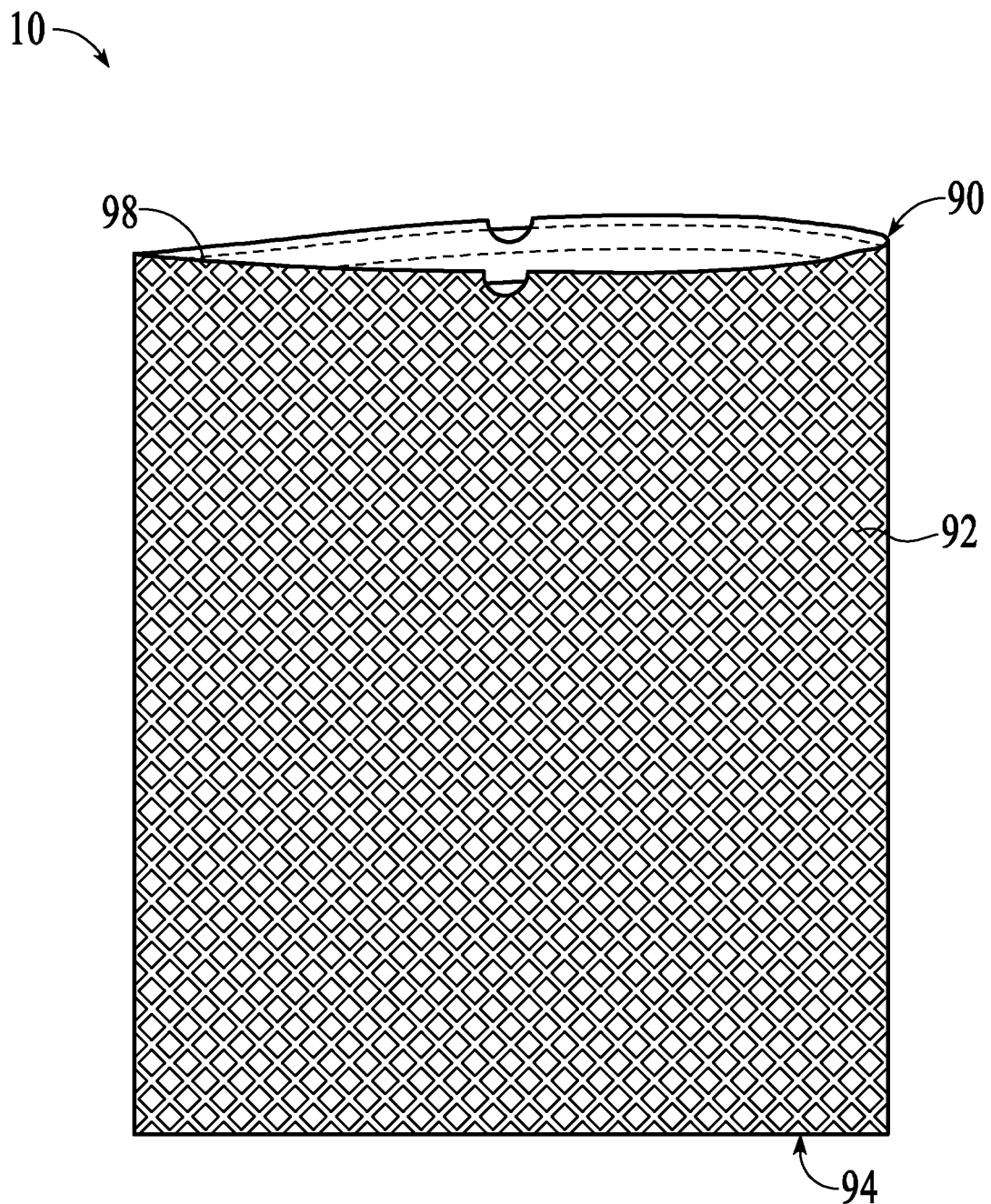
FIG. 9 is a perspective view of a bag of the invention.
Figure 10:
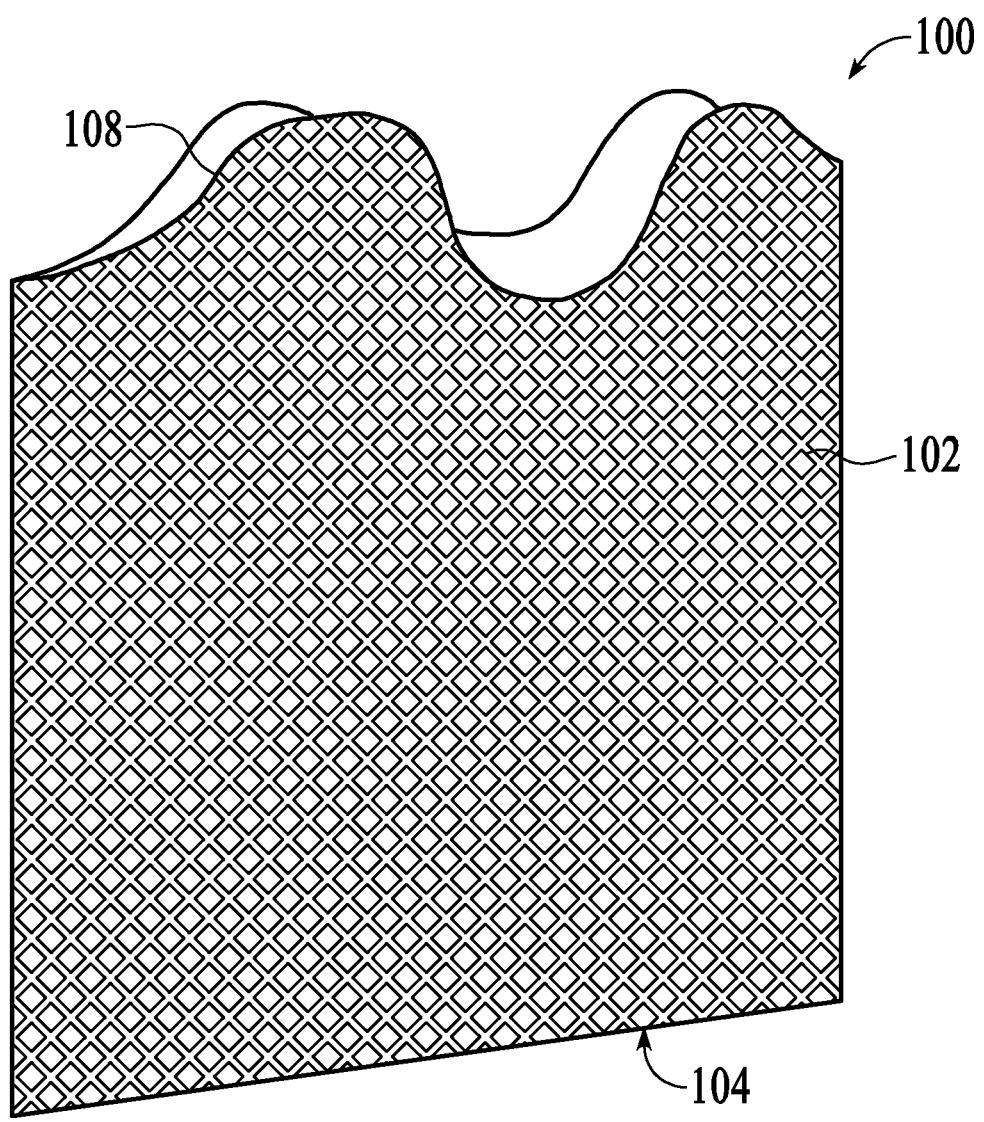
FIG. 10 is a perspective view of a bag of the invention.

FIG. 8 illustrates a draw tape bag 80 where the discontinuous lamination pattern 82 starts at a point up from the bottom 84 on the bag to just below the bag hem 86. FIG. 9 illustrates a draw tape bag 90 where the discontinuous lamination pattern 92 goes from the bottom on the bag 94 to the top 98 of the bag 90. FIG. 10 illustrates a tie bag 100 where the discontinuous lamination pattern 102 goes from the bottom 104 of the bag to the top 108 of the bag 100.

Alternative Pattern Discontinuous Lamination

Figure 11:
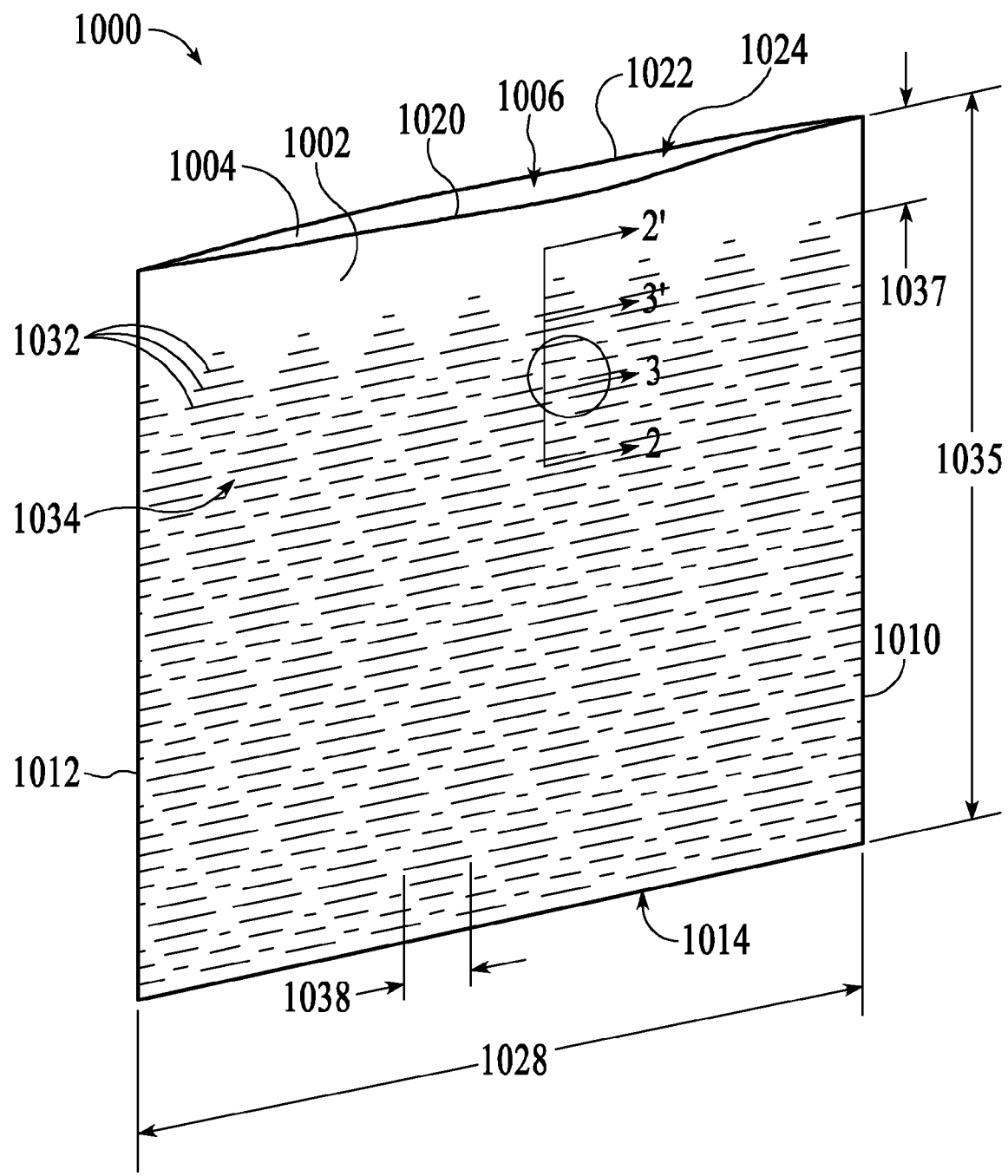
FIG. 11 is a perspective view of a bag of the invention.

Referring to FIG. 11, there is illustrated a thermoplastic bag 1000 which may be used as a liner for trash receptacles and refuse containers. The bag 1000 may be made from a first sidewall 1002 having multiple layers and an opposing, second sidewall 1004 having multiple layers that may be overlaid and joined to the first sidewall to define an interior volume 1006. In the illustrated embodiment, the first and second sidewalls are rectangular in shape, but in other embodiments may have other suitable shapes. The first and second sidewalls 1002, 1004 may be joined together along a first side edge 1010, a second side edge 1012 spaced apart from the first side edge, and a bottom edge 1014 that may extend between the first and second side edges. The sidewalls 1002, 1004 may be joined along their edges by any suitable joining process such as, for example, heat sealing in which the thermoplastic material bonds or melts together. Other sealing or joining processes may include ultrasonic methods and adhesive. In other embodiments, the bag 1000 may include gussets that join the sidewalls about their peripheries. To access the interior volume 1006, the top edges 1020, 1022 of the first and second sidewalls 1002, 1004 may remain un-joined to provide an opening 1024. The un-joined top edges 1020, 1022 may be separated or pulled apart to open the bag 1000. The first and second sidewalls 1002, 1004 may be two or more layers of flexible or pliable thermoplastic material.

At least the first sidewall 1002, and in some embodiments the second sidewall 1004, may include a plurality of discontinuous ribs 1032 formed or disposed therein. The discontinuous ribs 1032 also may be parallel with each other. The discontinuous ribs 1032 may have varying lengths with respect to each other. The maximum length of the discontinuous ribs, however, may be substantially less than the width of the bag. For example, the discontinuous ribs 1032 may have a maximum length 1038.

The discontinuous ribs 1032 may be arranged into a plurality of discrete or differentiated networks 1034 of multiple discontinuous ribs. For example, each network 1034 of discontinuous ribs 1032 may include a subset of the total plurality of discontinuous ribs that are immediately adjacent to one another. Additionally, the discontinuous ribs 1032 in each network 1034 are at least partially extensive with one another. In the illustrated embodiment, because the lengths of the discontinuous ribs 1032 vary, the networks 1034 may take on varying shapes such as the diamond shape that is illustrated. The bag contains multiple discrete or differentiated networks 1034 across its width, for example the bag may contain four or more networks 1034, or six or more networks 1034, or eight or more networks 1034.

The bag 1000 may have a height 1035. The height 1035 may have a first range from about 10 inches (25.4 cm) to about 48 inches (121.9 cm), a second range from about 24 inches (61 cm) to about 40 inches (101.6 cm), and a third range from about 27 inches (68.6 cm) to about 36 inches (91.4 cm). In one embodiment, the height 1035 may be about 27.4 inches (69.6 cm). The discontinuous ribs 1032 may terminate a distance 1037 below the opening. The distance 137 may have a first range from about 1.5 inches (3.8 cm) to about 6 inches (15.2 cm), a second range from about 2 inches (5.1 cm) to about 5 inches (12.7 cm), and a third range from about 2.25 inches (5.7 cm) to about 4 inches (10.2 cm). In one embodiment, the distance 137 may be about 2.75 inches (7 cm).

Figure 12:
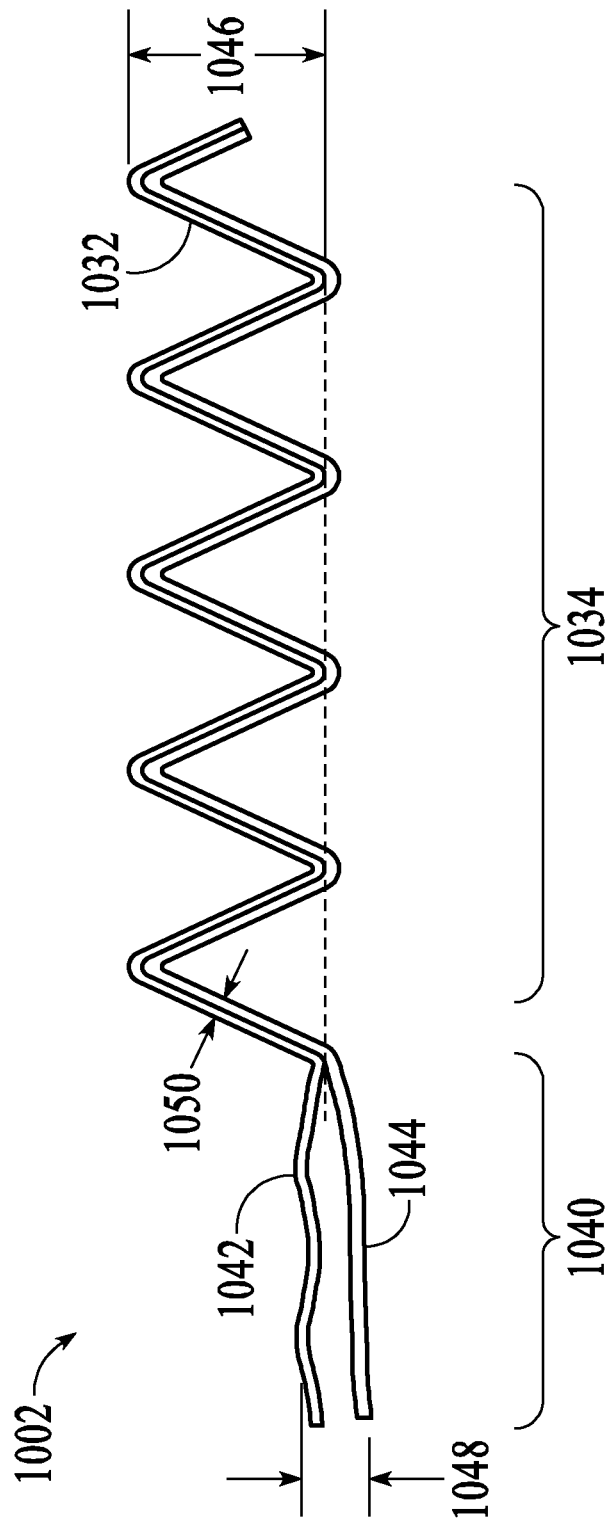
FIG. 12 is a cross-sectional view of a section 3-3' along 2-2' of a laminate of the invention.

Referring to FIG. 12, the discontinuous ribs 1032 are illustrated. The discontinuous ribs 1032 represent areas of bonding between multiple layers 1042, 1044 of the sidewall 1002. Referring to FIG. 12, each of the discontinuous ribs 1032 may have a repeating but alternating V-shape, but in other embodiments the ribs may have other suitable shapes or forms. For example, the shape of the first and second ribs may be corrugated or sinusoidal in shape. As further described herein, the shape of the ribs may be imparted or impressed into the thin, planar web material that the bag sidewalls are made from. The overall height 1046 of the discontinuous ribs 1032 may be greater than the overall thickness 1048 of the multiple layers 1042, 1044 in the unbonded regions 1040 between the bonded networks 1034. The thickness 1050 in the bonded network 1034 may be less than the overall thickness 1048 of the multiple layers 1042, 1044 in the unbonded regions 1040. Prior to pattern discontinuous lamination, the separate layers can be flat film or can be subject to any of the separate processes described above, such as stretching, slitting, coating and printing, and corona treatment.

Figure 13:
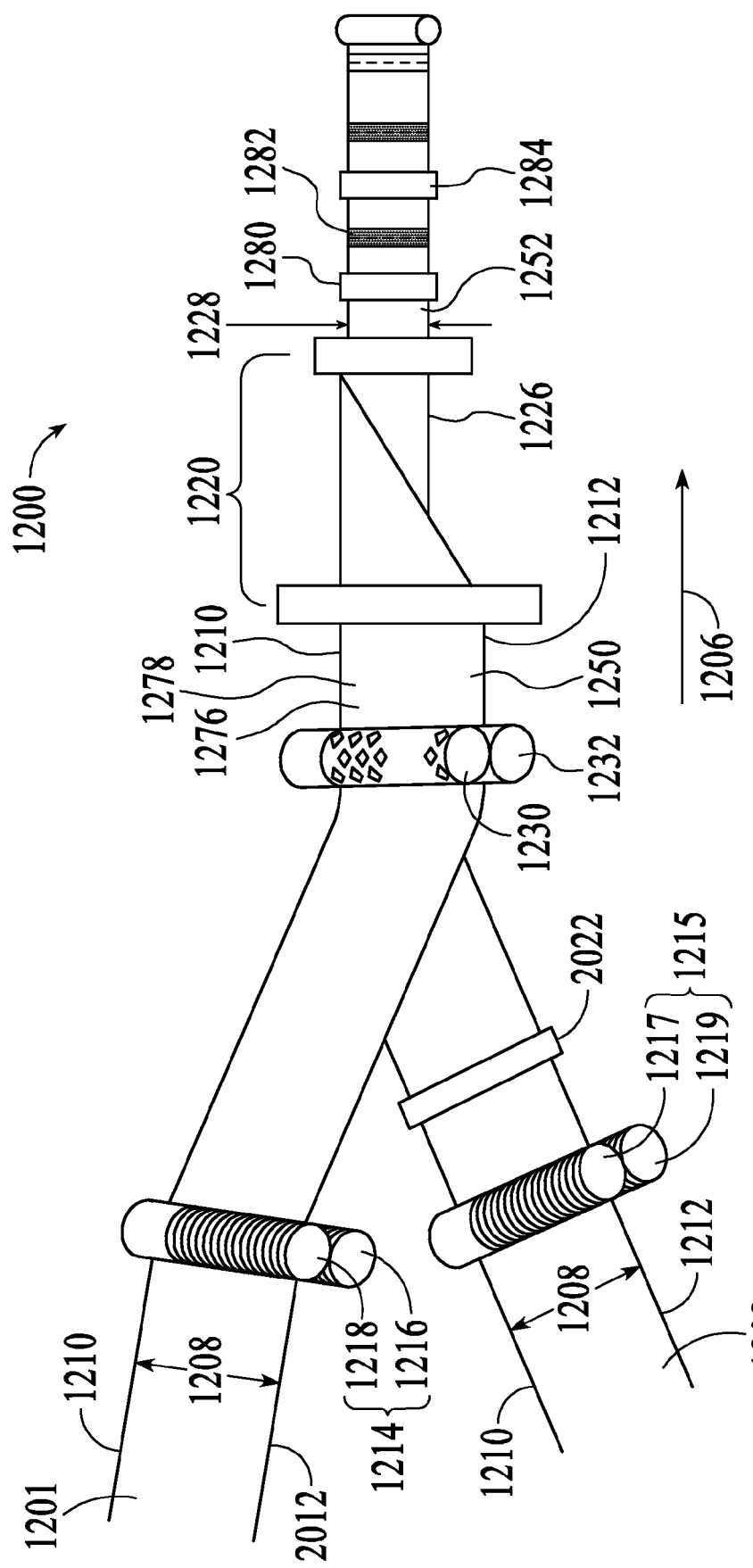
FIG. 13 is a process of the invention.

To produce a bag having discontinuous ribs as described herein, there is schematically illustrated in FIG. 13 one example of a high speed manufacturing process 1200 that may process multiple layers of continuous thermoplastic film into the finished bags. A first film 1201 may be initially provided in a roll or film forming process as described above. The film 1201 is directed along a machine direction 1206 by the processing equipment. The film 1201 may have an initial width 1208 between a first edge 1210 and a second edge 1212 of the film 1201. The web may be processed in a stretching operation 1214, for example using a pair of TD incrementally stretching rollers 1216, 1218, or any of the stretching operations as described herein. A second film 1202 may be initially provided in a roll or film forming process as described above. The film 1202 is directed along a machine direction 1206 by the processing equipment. The film 1202 may have an initial width 1208 between a first edge 1210 and a second edge 1212 of the film 1202. The web may be processed in a stretching operation 1215, for example using a pair of TD incrementally stretching rollers 1217, 1219, or any of the stretching operations as described herein. The first film 1201 and the second film 1202 may be overlaid for laminate processing.

To impart or form the discontinuous lamination of the films 1201, 1202, the processing equipment may include a cylindrical roller 1230 and an adjacent second cylindrical roller 1232 between which the films 1201, 1202 may be directed by the processing equipment. The rollers 1230, 1232 may be arranged so that their longitudinal axes may be perpendicular to the machine direction 1206 and may be adapted to rotate about their longitudinal axes in opposite rotational directions. In various embodiments, motors may be provided that power rotation of the rollers 1230, 1232 in a controlled manner. The first and second rollers 1230, 1232 may be made from any suitable material including, for example, metal, such as, steel or titanium. The rollers 1230, 1232 may have discontinuous ridges on the rollers which may impart the discontinuous patterns into the film layers during the process of discontinuous lamination. After the film layers 1201, 1202 have passed between the rollers 1230, 1232, the laminate film 1250 includes discontinuous patterns 1276 of bonded areas with unbonded areas 1278 in between.

To provide the two opposing sidewalls of the finished bag, the film laminate 1250 may be folded by a folding operation 1220. During the folding operation 1220, the first edge 1210 of the laminate 1250 is moved adjacent to the second edge 1212 so as to form a fold edge 1226 that may run parallel with the machine direction 1206. The folded laminate 1252 may have a width 1228 that is half of the original width 1208. The processing equipment may further process the folded laminate 1252 after it passes through the folding operation 1220. For example, referring to FIG. 13, to form the side edges of the finished bag, the folded laminate 1252 may proceed through a sealing operation 1280 by which heat seals 1282, perpendicular to the machine direction 1206 and spaced intermittently along the laminate, are formed between the fold edge 1226 and the adjacent edges 1210, 1212. The heat seals 1282 may fuse together the adjacent halves of the folded laminate 1252. After sealing the web halves together, a perforating operation 1284 may form perforations along the heat seals 1282 to simplify detaching individual bags from the remainder of the laminate. The perforations may pierce through the laminate but allow the individual bags to remain attached to each other. In another embodiment, the film laminate may be folded one or more times prior to the perforation operation. The film laminate of processed bags may be wound up into a roll 1292 for packaging and distribution. For example, the roll 1292 may be placed into a box or bag for sale to a customer. In another embodiment, folded laminate 1252 may be cut into individual bags along the heat seals 1282 by cutting operation. In another embodiment, the folded laminate may be folded one or more times prior to the cutting operation. In another embodiment, the side sealing operation may be combined with the cutting operation.

Laminate Combinations

In one embodiment, the invention comprises one or more film layers laminated by a discontinuous or partially discontinuous lamination process, such as a strainable network process or ring rolling process. In one embodiment, the invention comprises one or more film layers laminated by a discontinuous or partially discontinuous lamination process, such as a strainable network process or ring rolling process, where one of the layers has been stretched by a MD or TD ring rolling process or other stretching processes prior to lamination. In one embodiment, the invention comprises one or more film layers laminated by a discontinuous or partially discontinuous lamination process, such as a strainable network process or ring rolling process, where more than one of the layers has been stretched by a MD or TD ring rolling process or other stretching processes prior to lamination. In one embodiment, the invention comprises one or more film layers laminated by a discontinuous or partially discontinuous lamination process, such as a strainable network process or ring rolling process, where at least one of the layers has been stretched by a MD ring rolling process and a TD ring rolling process or other stretching process prior to lamination. In one embodiment, the invention comprises one or more film layers laminated by a discontinuous or partially discontinuous lamination process, such as a strainable network process or ring rolling process, where more than one of the layers has been stretched by both a MD ring rolling process and a TD ring rolling process (or any two stretching processes) prior to lamination. Additional laminate combinations using combinations of processes described within are also anticipated. One suitable lamination process condition is cold forming, where the layers are laminated without the application of external heating or adhesive. However, lamination process conditions involving adhesive, ultrasonic energy, or external heating are also anticipated.

Laminate of Films Having Different Properties

In some embodiments, the different laminated layers may have different properties. For example, the interior bag layer may be more puncture resistant and the exterior bag layer may have better strain properties. It is contemplated within the invention that each layer of the discontinuous or partially discontinuous laminate may be optimized for a different physical property. The optimization of different physical properties for different laminate layers can lead to superior overall discontinuous or partially discontinuous laminate performance versus the performance of traditional continuous laminates or non-laminated layers. Since the discontinuous laminate layers can operate both together and independently because of their discontinuous or partially discontinuous laminate structure, this can give the laminate structure advantages over continuous laminates where the layers can only act together or must always act separately. Where the laminate layers of a bag have properties that are independently optimized, the discontinuous or partially discontinuous laminate may actto have properties that are superior to bags formed by other means. For example, referring to FIG. 4, the bonded areas 34 may act as a single bag while the unbonded areas 32 may act as a bag within a bag. Referring to FIG. 1B, the top part of the bag may act as a discontinuously laminated bag within a bag, while the bottom of the bag acts as a bag with two separate layers.

EXAMPLES

Network Discontinuous Lamination

Mono-layer and multi-layer films were formed and subjected to varying stretch processes and network discontinuous co-lamination processes. Table I lists the films tested and processes and Table II lists the physical properties of the mono-layer and multi-layer films produced in Table I. The results from Table II indicate that the bi-layer films bonded with discontinuous lamination can have significantly improved properties, such as the energy to maximum load (Dynatup Max), which relates to impact resistance. The melt index of the films of the layers of the present invention is determined under ASTM D-1238, Condition E. It is measured at 190 degrees Celsius and 2.16 kilograms and reported as grams per 10 minutes.

TABLE I

Films Tested

| Film | Layer 1 | Process | Layer 2 | Process | Discontinuous Network Co-lamination | Gauge (Mils) |
|---|---|---|---|---|---|---|
| A | LLDPE | | | | | 0.40 |
| B | LDPE | | | | | 0.40 |
| C | HDPE | | | | | 0.40 |
| D | LLDPE | | | | Yes | 0.40 |
| E | LDPE | | | | Yes | 0.40 |
| F | HDPE | | | | Yes | 0.40 |
| G | LLDPE | | LLDPE | | Yes | 0.80 |
| H | LDPE | | LDPE | | Yes | 0.80 |
| I | HDPE | | HDPE | | Yes | 0.80 |
| J | LLDPE | TD RR | LDPE | TD RR | Yes | 0.80 |
| K | LLDPE | TD RR | HDPE | TD RR | Yes | 0.80 |
| L | LDPE | TD RR | HDPE | TD RR | Yes | 0.80 |
| M | LLDPE | MD RR | LLDPE | TD RR | Yes | 0.80 |
| N | LLDPE | MD RR | LDPE | TD RR | Yes | 0.80 |
| O | LLDPE | MD RR | HDPE | TD RR | Yes | 0.80 |

LLDPE has a density of 0.920 and a Melt Index of 1.000. LDPE has a density of 0.926 and a Melt Index of 0.800.
HDPE has a density of 0.959 and a Melt Index of 0.057.
TD RR is TD ring rolling at 40 Pitch.
MD RR is MD ring rolling at 60 Pitch.
Co-lamination is Strainable Network at 0.038" DOE.

TABLE II

Physical Properties

| Film | Tear MD | Tear TD | Yield MD | Yield TD | Peak Load MD | Peak Load TD | Strain@Break MD | Strain@Break TD | Dynatup Energy to max. load |
|---|---|---|---|---|---|---|---|---|---|
| A | 165 | 274 | 0.66 | 0.64 | 3.44 | 1.59 | 532 | 606 | 3.10 |
| B | 72 | 283 | 0.81 | 0.86 | 3.72 | 2.28 | 482 | 660 | 0.25 |
| C | 3 | 314 | 1.74 | 0.86 | 3.83 | 0.89 | 268 | 135 | N.A. |
| D | 181 | 176 | 0.55 | 0.60 | 1.21 | 1.44 | 352 | 557 | 3.20 |
| E | 175 | 197 | 0.70 | 0.75 | 1.46 | 1.21 | 331 | 473 | 1.71 |
| F | 12 | 170 | 0.30 | 3.13 | 1.70 | 0.70 | 115 | 64 | 0.45 |
| G | 372 | 427 | 1.12 | 1.25 | 2.92 | 2.59 | 389 | 551 | 5.81 |
| H | 312 | 375 | 1.39 | 1.54 | 2.83 | 2.39 | 346 | 518 | 3.60 |
| I | 14 | 220 | 1.20 | 0.44 | 2.71 | 1.07 | 112 | 78 | 0.87 |
| J | 392 | 385 | 1.21 | 1.40 | 3.19 | 2.71 | 385 | 540 | 4.15 |
| K | 191 | 292 | 1.75 | 1.27 | 2.62 | 1.53 | 61 | 535 | 3.32 |
| L | 158 | 288 | 2.20 | 1.50 | 3.00 | 1.55 | 252 | 498 | 2.63 |
| M | 539 | 368 | 1.26 | 1.26 | 3.32 | 3.06 | 456 | 401 | 7.19 |
| N | 544 | 383 | 1.27 | 1.69 | 2.18 | 2.91 | 365 | 362 | 6.96 |
| O | 574 | 189 | 1.44 | 3.87 | 1.74 | 3.87 | 404 | 157 | 1.41 |
| Control | 225 | 625 | 1.46 | 1.43 | 6.29 | 4.36 | 476 | 665 | |

Tear in gms.
Yield in Lb$_f$
Peak Load in Lb$_f$
Strain@Break in %
Dynatup Energy to Max in In-Lb$_f$
Control is 0.9 Mil LDPE film Another set of films was evaluated with different levels of stretch processes with and without discontinuous co-lamination. The results show the benefit of discontinuous co-lamination of the Dynatup Energy to maximum load.

TABLE III

Additional Examples

| Film | Layer 1 Process | Layer 2 Process | Discontinuous Network Co-lamination | Dynatup Energy to max. load | Gauge Initial (mils) | Gauge Final (mils) |
|---|---|---|---|---|---|---|
| P | None | None | Yes | 18.3 | 2.14 | 2.12 |
| Q | MD-1 | TD-1 | No | 7.2 | 2.14 | 1.92 |

TABLE III-continued

Additional Examples

| Film | Layer 1 Process | Layer 2 Process | Discontinuous Network Co-lamination | Dynatup Energy to max. load | Gauge Initial (mils) | Gauge Final (mils) |
|------|-----------------|-----------------|-------------------------------------|------------------------------|----------------------|---------------------|
| R    | MD-1            | TD-1            | Yes                                 | 17.1                         | 2.14                 | 1.93                |
| S    | MD-2            | TD-2            | No                                  | 8.7                          | 2.14                 | 1.68                |
| T    | MD-2            | TD-2            | Yes                                 | 15.3                         | 2.14                 | 1.63                |
| Base | No              | No              | No                                  | 5                            | 1.07                 | 1.07                |

Ring Rolling Discontinuous Lamination

Samples of cold processed MD ring rolled (at 0.100" DOE, 0.100" pitch, 0.040" pitch) LDPE film were laminated under a cold TD ring rolling process (at 0.020" DOE) to achieve unexpected tear properties. The MD Tear and the TD Tear were synergistically enhanced under the discontinuous lamination process. Bonding could be modified by addition of a tackifier or an anti-block agent to the other skin plies of a multi-ply layer or to the composition of a single ply material. For example, the outer skin layers could contain from 0 to 50% of a polyolefin plastomer tackifier such as DOW Affinity™ 8100 to adjust bonding. For example, the outer skin plies or a single ply layer could contain higher levels of slip or anti-block agents, such as talc or oleamide, to decrease tack, or have very low levels or no slip or anti-block agents to increase tack. In addition, by laminating a white layer with a colored layer, in this case black, the bonded and non-bonded areas of the laminate were visually distinct.

TABLE IV

Ring Rolled Laminates

| Sample | MD Tear | TD Tear |
|--------|---------|---------|
| TD ring rolled laminate of A and B, 21.5 gsm | 429 | 881 |
| A. MD ring rolled, Black top layer[a] | 193 | 580 |
| B. MD ring rolled, White bottom layer[b] | 261 | 603 |
| TD ring rolled laminate of C and D, 18.8 gsm | 314 | 876 |
| C. MD ring rolled, Black top layer[c] | 170 | 392 |
| D. MD ring rolled, Black bottom layer[c] | 151 | 470 |
| TD ring rolled laminate of E and F, 21.1 gsm | 312 | 1018 |
| E. MD ring rolled, Black top layer[a] | 218 | 765 |
| F. MD ring rolled, Black bottom layer[c] | 170 | 387 |

[a] 14 gsm 3 ply black layer with outer skin plies containing 30% DOW Affinity™ 8100 and 2% talc, processed at blowup ratio A and MD ring rolled.
[b] 14 gsm 3 ply white layer with 2% slip agent in outer skin plies, processed at blowup ratio 1.5A and MD ring rolled
[c] 14 gsm 3 ply black layer with outer skin plies containing 30% DOW Affinity™ 8100 and 2% talc, processed at blowup ratio 1.5A and MD ring rolled Adhesive Lamination In Table V, one layer was subjected to cold processing by MD ring rolling and the other layer was subjected to cold processing by TD ring rolling and then the two layers were laminated by a butene-1-copolymer, hot melt adhesive, Rextac® RT 2730 at different levels. Table V also shows comparative properties of the two layers not laminated together, as well as the properties of each layer and comparable layers not cold processed by ring rolling. The results show that even with very low adhesive coating, superior Dynatup, MD Tear and TD Tear properties are achieved compared to two layers of non-laminated film or one layer of thicker film.

TABLE V

Adhesive Laminates of ring rolled film

| | Coat Weight g/sq. ft. | Gage by Wt. | Tensile Peel (g-f) | Dynatup Peak Load (lb-f) | Dynatup Energy to max load (in. lb-f) | MD Tear (g) | TD Tear (g) |
|---|---|---|---|---|---|---|---|
| Sample[a] | 0.225 | 0.84 | N/A | 11.3 | 8.4 | 434 | 585 |
| Sample[a] | 0.056 | 0.84 | N/A | 11.1 | 11.2 | 496 | 539 |
| Sample[a] | 0.015 | 0.84 | 61 | 10.5 | 9.2 | 387 | 595 |
| Sample[a] | 0.012 | 0.84 | 57 | 11.3 | 10.4 | 425 | 643 |
| Comparative A[b] | NA | 0.84 | N/A | 9.4 | 6.9 | 326 | 502 |
| Comparative B[c] | NA | 0.4 | N/A | 4.6 | 4.4 | 101 | 60 |
| Comparative C[d] | NA | 0.44 | N/A | 5.4 | 4.8 | 173 | 475 |
| Comparative D[e] | NA | 0.6 | N/A | 5.1 | 6.3 | 298 | 473 |
| Comparative E[f] | NA | 0.9 | NA | 4.3 | 3.8 | 262 | 843 |

[a] two layers of film each having a core ply of LLDPE with white pigment and outer plies of LLDPE\LDPE\Antiblock blend, one layer is MD ring rolled and the other layer is TD ring rolled. two 0.42 g/cm² layers with no adhesive, one MD ring rolled, one TD ring rolled
[c] one layer TD ring rolled
[d] one layer MD ring rolled
[e] one layer unstretched film
[f] one layer unstretched film In Table VI, two layers of the same film composition as in Table V were each subjected to cold processing by MD ring rolling at 0.110" DOE followed by cold processing by TD ring rolling at 0.032" DOE and then the two layers were laminated by the same adhesive at different coating levels. Table VI also shows comparative properties of a single layer with a higher basis weight which was not cold processed by ring rolling. Note that even at low adhesive levels and low tensile peel, that the caliper, Dynatup, Dart Drop, and MD tear remain high relative to a heavier basis weight single layer film.

TABLE VI

Adhesive Laminates of ring rolled film

| Coat Weight g/sq. ft. | Gage by Wt. (mils) | Caliper 1" Foot (mils) | Tensile Peel (g-f) | Dynatup Peak Load (lb-f) | Dynatup Energy to max load (in. lb-f) | Dart Drop F50 (g) | MD Tear (g) | TD Tear (g) |
|---|---|---|---|---|---|---|---|---|
| 0.0300 | 0.64 | 1.71 | 81.5 | 11.5 | 11.28 | 254.0 | 418 | 511 |
| 0.0150 | 0.65 | 1.85 | 25.5 | 10.3 | 9.61 | | 349 | 441 |
| 0.0100 | 0.67 | 1.81 | 27.6 | 10.6 | 9.34 | 264.0 | 353 | 406 |
| 0.0075 | 0.66 | 1.79 | 2.27 | 9.7 | 10.99 | | 335 | 423 |
| 0.0060 | 0.66 | 1.87 | 7.79 | 9.9 | 12.21 | 260.0 | 319 | 450 |
| NA, Single layer | 0.9 | 0.88 | NA | 4.3 | 3.8 | 180 | 262 | 843 |

In Table VII, one white layer of HDPE was cold stretched by MD ring rolling at 0.110 DOE and another black layer of LLDPE was cold stretched by MD ring rolling at 0.110 DOE followed by TD ring rolling at 0.032 DOE and then laminated together with the same adhesive. Again, with the two ply laminates superior properties were obtained even at very low adhesive levels compared to a single ply film.

TABLE VII

Adhesive Laminates of twice ring rolled film

| Coat Weight g/sq. ft. | Gage by Wt. (mils) | Dynatup Peak Load (lb-f) | Dynatup Energy to max load (in. lb-f) | Dart Drop F50 (g) | MD Tear (g) | TD Tear (g) |
|---|---|---|---|---|---|---|
| 0.0300 | 0.67 | 11.8 | 11.86 | 284 | 357 | 575 |
| 0.0150 | 0.67 | 11.8 | 14.21 | | 357 | 532 |
| 0.0100 | 0.67 | 11.0 | 10.77 | 288 | 373 | 502 |
| 0.0075 | 0.67 | 11.8 | 11.60 | | 360 | 530 |
| 0.0060 | 0.67 | 12.6 | 10.57 | 260 | 385 | 535 |
| NA, Single Ply | 0.67 | 4.3 | 3.8 | 180 | 262 | 843 |

In Table VIII, the adhesively laminated layers were compared to single ply materials of heavier basis weight using a consumer test with 17 lbs. of mixed garbage on an end use scale of 1-5. The laminate of two layers which were independently MD ring rolled and then TD ring rolled followed by adhesive lamination has an excellent score comparable to single layer bags of higher basis weight.

TABLE VIII

| Sample | Gage by Wt. (mils) | End use score |
|---|---|---|
| Adhesively laminated layers | 0.66 | 4.16 |
| MD ring rolled single layer | 0.80 | 4.08 |
| Strainable network single layer | 0.85 | 4.50 |

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A laminate thermoplastic film comprising:
   a first continuous thermoplastic layer of film comprising a first plurality of alternating stretched and un-stretched increments extending perpendicular to a machine direction of the first continuous thermoplastic layer of film;
   a second continuous thermoplastic layer of film; and
   a plurality of partially discontinuous bonds laminating the first continuous thermoplastic layer of film directly to the second continuous thermoplastic layer of film, the partially discontinuous bonds extending parallel to a machine direction of the second continuous thermoplastic layer of film and the machine direction of the first continuous thermoplastic layer of film;
   wherein the machine direction of the first continuous thermoplastic layer of film is parallel to the machine direction of the second continuous thermoplastic layer of film.

2. The laminate film of claim 1, wherein at least one of the first continuous thermoplastic layer of film and the second continuous thermoplastic layer of film is a multi-ply film layer.

3. The laminate film of claim 1, wherein the MD tear of the laminate is greater than the MD tear of any of the individual layers.

4. The laminate film of claim 1, wherein the Dynatup peak load of the laminate is greater than the Dynatup peak load of any of the individual layers.

5. The laminate film of claim 1, wherein partially discontinuous bonds securing the first continuous thermoplastic layer of film to the second continuous thermoplastic layer of film are evenly spaced.

6. The laminate film of claim 1, wherein the second continuous thermoplastic layer of film comprises a second plurality of alternating stretched and un-stretched increments extending perpendicular to the machine direction of the second continuous thermoplastic layer of film.

7. The laminate film of claim 1, wherein the partially discontinuous bonds securing the first continuous thermoplastic layer of film to the second continuous thermoplastic layer of film are pressure bonds.

8. The laminate film of claim 1, wherein the the first continuous thermoplastic layer of film comprises a third plurality of alternating stretched and un-stretched increments extending parallel to the machine direction of the first continuous thermoplastic layer of film.

9. The laminate film of claim 1, wherein the partially discontinuous bonds securing the first continuous thermoplastic layer of film to the second continuous thermoplastic layer of film are adhesive bonds.

10. The laminate film of claim 1, wherein the partially discontinuous bonds securing the first continuous thermoplastic layer of film to the second continuous thermoplastic layer of film are ultrasonic bonds.

11. The laminate film of claim 1, wherein the the first continuous thermoplastic layer of film comprises a third plurality of alternating stretched and un-stretched increments extending parallel to the machine direction of the first continuous thermoplastic layer of film.

12. A laminate thermoplastic film comprising:
a first continuous layer of thermoplastic film comprising one of:
a plurality of alternating stretched and un-stretched increments extending perpendicular to a machine direction of the first continuous thermoplastic layer of film,
a plurality of alternating stretched and un-stretched increments extending parallel to the machine direction of the first continuous thermoplastic layer of film, or
a plurality of rib like elements in a discontinuous strainable network;
a second continuous layer of thermoplastic film comprising another of:
the plurality of alternating stretched and un-stretched increments extending perpendicular to a machine direction of the first continuous thermoplastic layer of film,
the plurality of alternating stretched and un-stretched increments extending parallel to the machine direction of the first continuous thermoplastic layer of film, or
the plurality of rib like elements in the discontinuous strainable network; and
a plurality of discontinuous or partially discontinuous bonds laminating the first continuous layer of thermoplastic film directly to the second continuous layer of thermoplastic film
wherein the machine direction of the first continuous layer of thermoplastic film is parallel to a machine direction of the second continuous layer of thermoplastic film.

13. The laminate film of claim 12, wherein:
the first continuous layer of thermoplastic film comprises the plurality of alternating stretched and un-stretched increments extending perpendicular to the machine direction of the first continuous thermoplastic layer of film; and
the second continuous layer of thermoplastic film comprises the plurality of alternating stretched and un-stretched increments extending parallel to the machine direction of the first continuous thermoplastic layer of film.

14. The laminate film of claim 13, wherein:
the plurality of bonds comprise partially discontinuous bonds; and
the plurality of partially discontinuous bonds are aligned with the plurality of alternating stretched and un-stretched increments extending parallel to the machine direction of the first continuous thermoplastic layer of film.

15. The laminate film of claim 12, wherein the second continuous layer of thermoplastic film comprises the plurality of rib like elements in the discontinuous strainable network.

16. The laminate film of claim 12, wherein:
the plurality of bonds comprise discontinuous bonds; and
the plurality of discontinuous bonds are aligned with the discontinuous strainable network.

17. A laminate thermoplastic film consisting essentially of:
a first continuous layer of thermoplastic film including:
a first plurality of alternating stretched and un-stretched increments extending perpendicular to a machine direction of the first continuous thermoplastic layer of film;
a second plurality of alternating stretched and un-stretched increments extending parallel to the machine direction of the first continuous thermoplastic layer of film;
a second continuous layer of thermoplastic film including:
a third plurality of alternating stretched and un-stretched increments extending perpendicular to the machine direction of the first continuous thermoplastic layer of film;
a fourth plurality of alternating stretched and un-stretched increments extending parallel to the machine direction of the first continuous thermoplastic layer of film; and
a plurality of partially discontinuous bonds laminating the first continuous layer of thermoplastic film to directly the second continuous layer of thermoplastic film;
wherein the plurality of partially discontinuous bonds, the fourth plurality of alternating stretched and un-stretched increments extending parallel to the machine direction of the first continuous thermoplastic layer of film, and second plurality of alternating stretched and un-stretched increments extending parallel to the machine direction of the first continuous thermoplastic layer of film are all aligned.

18. The laminate film of claim 17, wherein a machine direction of the first continuous thermoplastic layer of film is parallel to a machine direction of the second continuous thermoplastic layer of film.

19. The laminate film of claim 17, wherein the plurality of partially discontinuous bonds are adhesive bonds.

20. The laminate film of claim 17, wherein the the laminate film forms the sidewalls of a bag.

* * * * *